(12) United States Patent
Bates et al.

(10) Patent No.: US 7,535,668 B2
(45) Date of Patent: May 19, 2009

(54) MODULATED TIMING BASED SERVO PATTERN STRINGS FOR MAGNETIC-BASED STORAGE MEDIA

(75) Inventors: Allen K. Bates, Tucson, AZ (US); Nils Haustein, Soergenloch (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 11/467,776

(22) Filed: Aug. 28, 2006

(65) Prior Publication Data

US 2008/0049348 A1 Feb. 28, 2008

(51) Int. Cl.
*G11B 27/32* (2006.01)

(52) U.S. Cl. .................................... 360/77.12

(58) Field of Classification Search .................. None
See application file for complete search history.

(56) References Cited

U.S. PATENT DOCUMENTS

| 5,406,545 | A | * | 4/1995 | Kadowaki | 369/275.3 |
|---|---|---|---|---|---|
| 5,689,384 | A | * | 11/1997 | Albrecht et al. | 360/77.12 |
| 5,930,065 | A | | 7/1999 | Albrecht et al. | |
| 2003/0016466 | A1 | | 1/2003 | Bui et al. | |
| 2004/0174132 | A1 | * | 9/2004 | Johnson et al. | 318/652 |
| 2005/0030662 | A1 | | 2/2005 | Bui et al. | |
| 2005/0099715 | A1 | | 5/2005 | Yip et al. | |
| 2006/0044671 | A1 | | 3/2006 | Weber et al. | |
| 2007/0115578 | A1 | * | 5/2007 | Winarski et al. | 360/48 |

FOREIGN PATENT DOCUMENTS

WO WO0072323 A1 11/2000

OTHER PUBLICATIONS

R. C. Barrett, et al, Timing-Based Track-Following Servo for Linear Tape Systems, IEEE Transactions on Magnetics, vol. 34, No. 4, Jul. 1998, pp. 1-6.

* cited by examiner

*Primary Examiner*—Mark Blouin
(74) *Attorney, Agent, or Firm*—Konrad Raynes & Victor LLP; Rabindranath Dutta

(57) ABSTRACT

A magnetic storage media has a servo track segment and a timing based servo band recorded on the servo track segment. The timing based servo band includes a modulated timing based servo pattern string representative of magnetic encoded servo position information for facilitating a determination of a servo position error signal. Exemplary forms of the modulation of the timing based servo pattern string includes a pattern interspacing modulation, a magnetic intensity modulation, and a pulse position modulation.

24 Claims, 24 Drawing Sheets

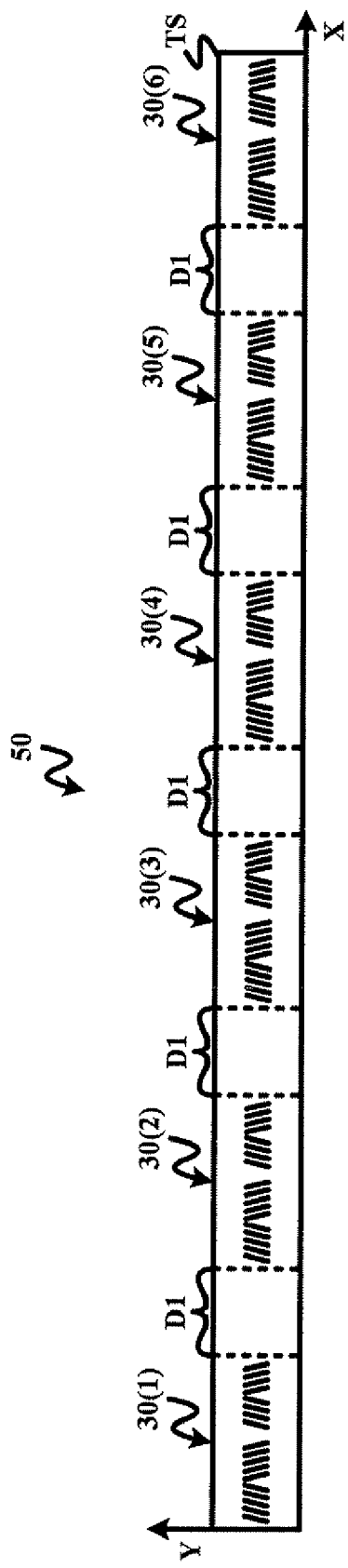
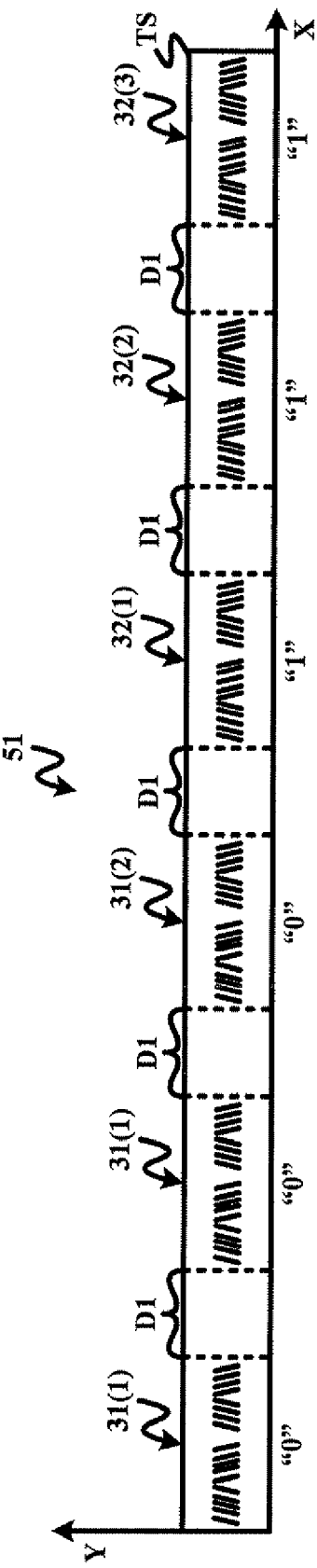
FIG. 8 (PRIOR ART)
FIG. 9 (PRIOR ART)

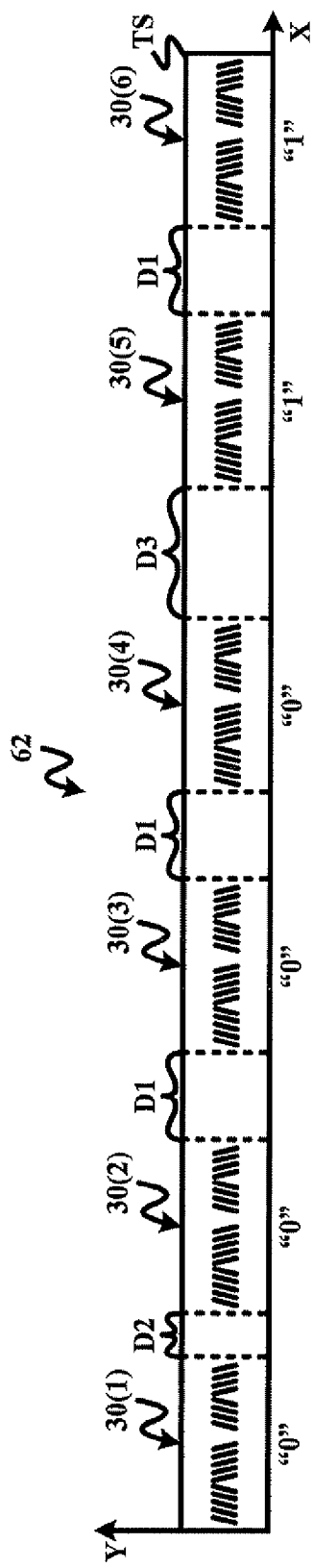
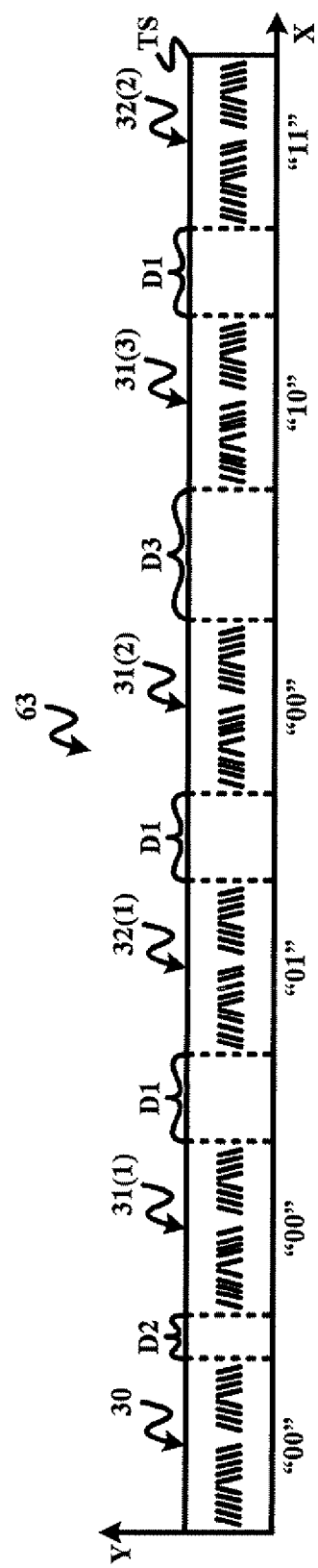
FIG. 12
FIG. 13

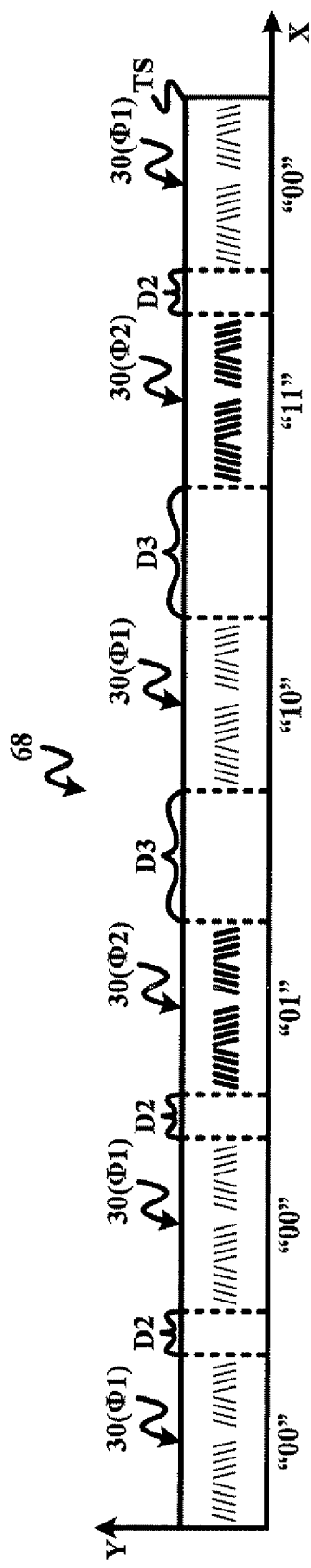
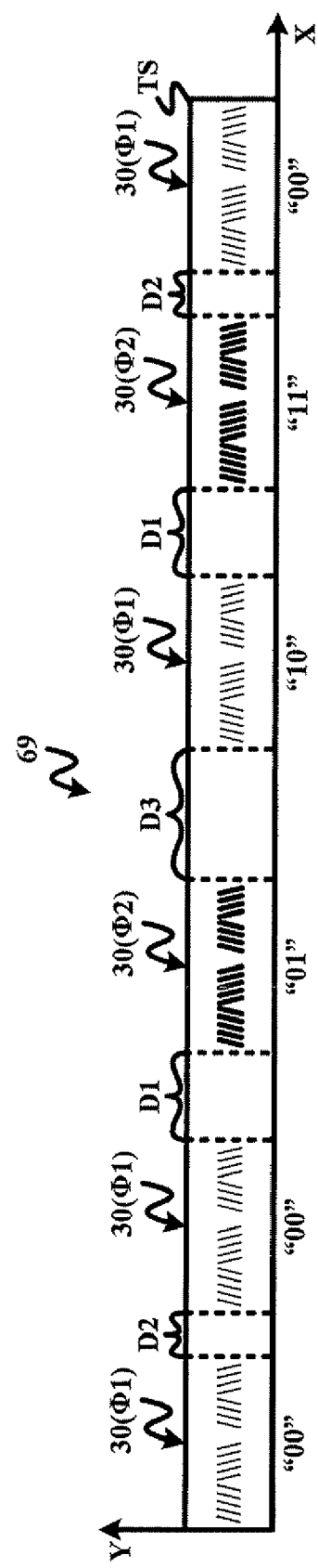
FIG. 18
FIG. 19

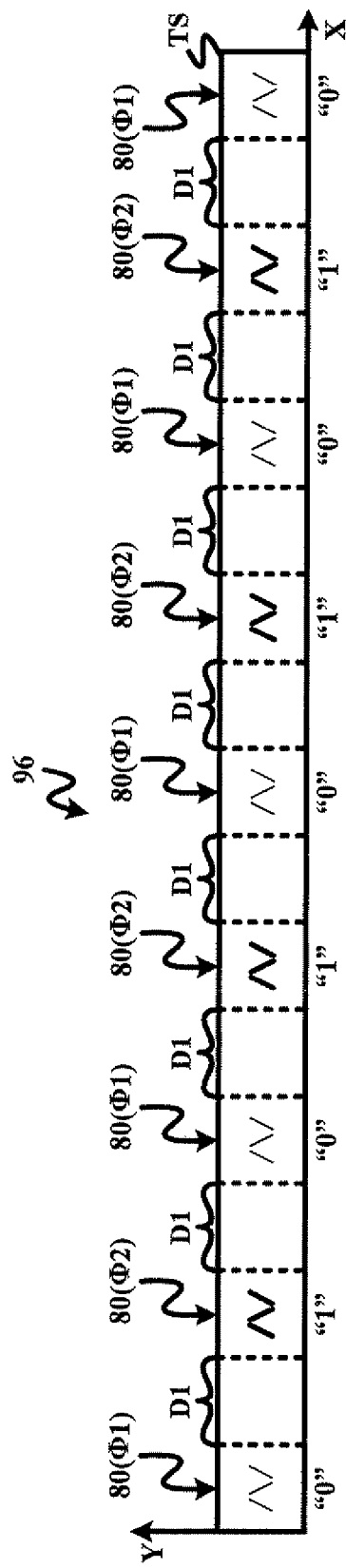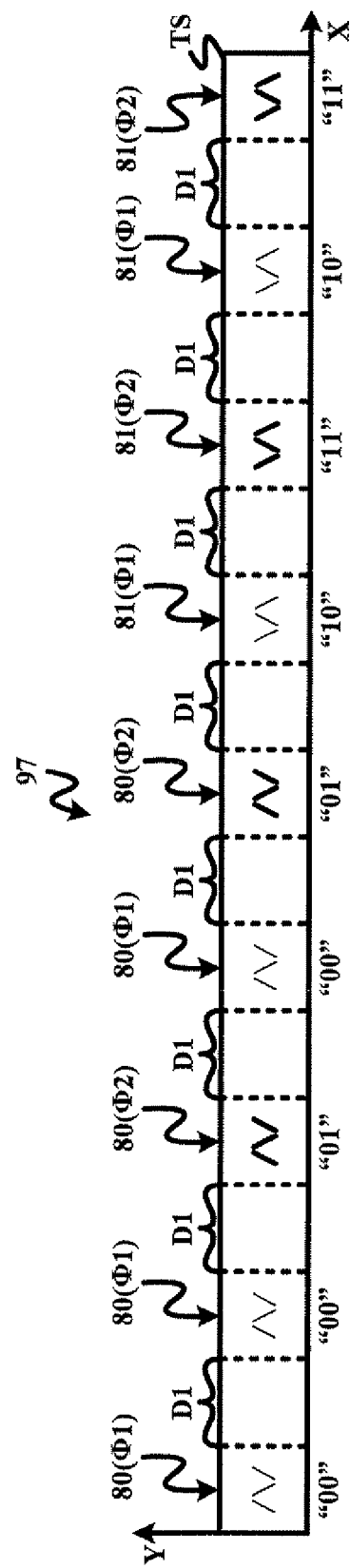

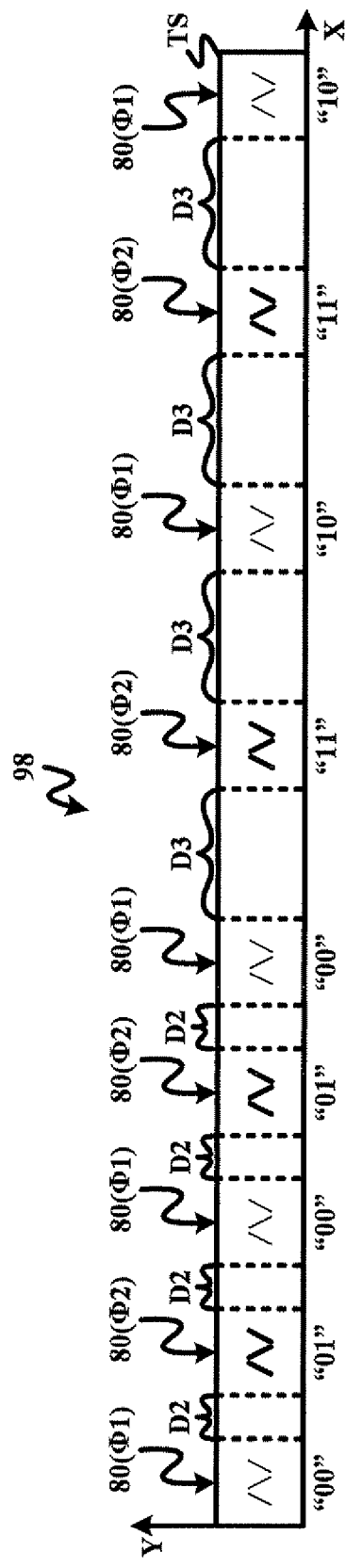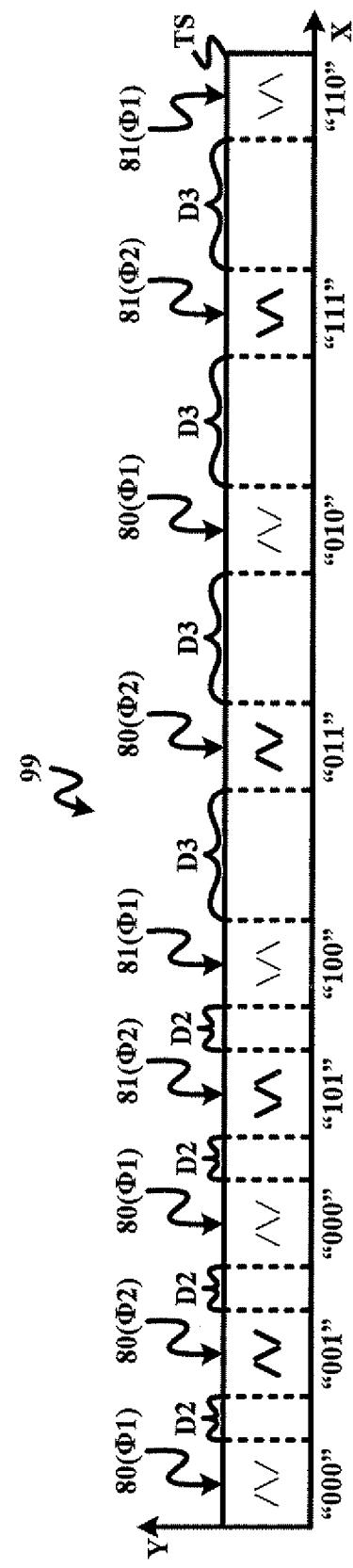

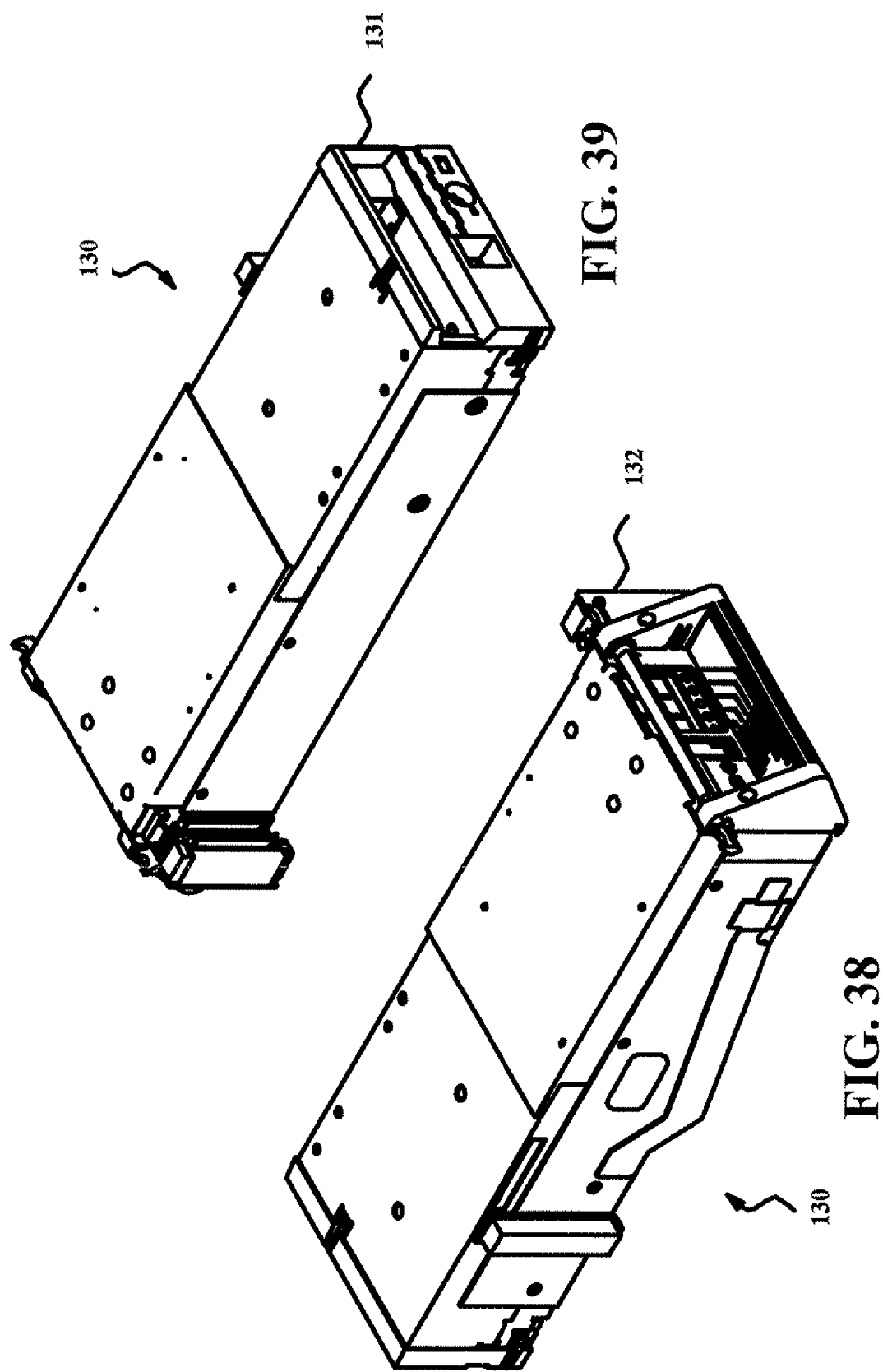

US 7,535,668 B2

MODULATED TIMING BASED SERVO PATTERN STRINGS FOR MAGNETIC-BASED STORAGE MEDIA

FIELD OF THE INVENTION

The present invention generally relates to servo position information recorded on magnetic-based storage media (e.g., a magnetic tape, a magneto-optical tape and an optical phase-change tape). The present invention specifically relates to the servo position information encoded as a differential timing based servo pattern recorded on the magnetic-based storage media.

BACKGROUND OF THE INVENTION

The recording and reading of data in tracks on magnetic storage media requires precise positioning of magnetic read/write heads. Specifically, a magnetic write head must be quickly moved to and centered over a data track to facilitate a selective recording of data onto the data track. In operation, the magnetic write head records data onto the data track as relative movement occurs between the magnetic write head and the magnetic storage media in a transducing direction. Thereafter, the magnetic write head can be moved across the width of the magnetic storage media in a translating direction, which is perpendicular to the transducing direction, to a different data track to thereby selectively record data onto this data track.

Similarly, a magnetic read head must be quickly moved to and centered over a data track to facilitate reading of data recorded on the data track. In operation, the magnetic read head reads data recorded onto the data track as relative movement occurs between the magnetic read head and the magnetic storage media in the transducing direction. Thereafter, the magnetic read head can be moved across the width of the magnetic storage media in the translating direction, which again is perpendicular to the transducing direction, to a different data track to thereby selectively read data recorded onto this data track.

Storage drive devices that employ such magnetic heads for recording data on data tracks of a magnetic storage media and for reading data recorded on the data tracks on magnetic storage media typically use servo control systems to properly position the magnetic heads in the translating direction. A servo control system derives servo position information from a servo read head that reads servo position information recorded in one or more servo tracks that are advantageously recorded among the data tracks of the magnetic storage media. Based on the servo position information, the servo control system properly aligns the servo read head as needed relative to the servo track(s) being read whereby an associated magnetic head will concurrently be properly aligned with a data track for facilitating a recording of data onto that data track or a reading of recorded data from that data track.

A design of a servo pattern for encoding the servo position information is essential to the ability of the servo control system in deriving the servo position information. An example of one type of servo pattern for encoding servo position information is a magnetic timing based servo pattern that facilitates a decoding of servo position information indicating a translational position of the servo read head relative to the magnetic storage media. The magnetic timing based servo pattern can further encode the servo position information whereby the decoded servo position information further indicates a transducing position of the servo read head relative to the magnetic storage media.

SUMMARY OF THE INVENTION

The present invention provides new and unique modulated timing based servo band that further advances servo control technology.

One form of the present invention is a magnetic storage media comprising a servo track segment and a timing based servo band recorded on the servo track segment, wherein the timing based servo band includes a modulated timing based servo pattern string representative of magnetic encoded servo position information for facilitating a determination of a servo position error signal.

A second form of the present invention is a magnetic storage media cartridge comprising a cartridge housing adapted to interface with a cartridge drive, and a magnetic storage media contained within the cartridge housing. The magnetic storage media includes servo track segment, and a timing based servo band recorded on the servo track segment, wherein the timing based servo band includes a modulated timing based servo pattern string representative of magnetic encoded servo position information for facilitating a determination of a servo position error signal.

A third form of the present invention is a magnetic storage media drive comprising a transducer, a servo decoder and a servo controller. The transducer includes a servo read head operable to generate a read head signal representative of a reading of a magnetic storage media having a servo track segment and a timing based servo band recorded on the servo track segment, wherein the timing based servo band includes a modulated timing based servo pattern string representative of magnetic encoded servo position information for facilitating a determination of a servo position error signal. The servo decoder is in electrical communication with the transducer to receive the read head signal to thereby generate a decoded servo position signal as a function of a determination of the servo position error signal based on the read head signal, the decoded servo position signal being indicative of a position of the transducer relative to the magnetic storage media. The servo controller is in electrical communication with the servo decoder to receive the decoded servo position signal to thereby generate a servo control signal for selectively moving the transducer relative to the magnetic storage media.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 8 illustrates an exemplary timing based servo band as known in the art;

FIG. 9 illustrates an exemplary LPOS encoded timing based servo band as known in the art;

FIG. 12 illustrates a third pattern interspace modulated embodiment of a LPOS encoded timing based servo band in accordance with the present invention;

FIG. 13 illustrates a fourth pattern interspace modulated embodiment of a LPOS encoded timing based servo band in accordance with the present invention;

FIG. 18 illustrates a first magnetic intensity/pattern interspacing modulated embodiment of a LPOS encoded timing based servo band in accordance with the present invention;

FIG. 19 illustrates a second magnetic intensity/pattern interspacing modulated embodiment of a LPOS encoded timing based servo band in accordance with the present invention;

FIG. 30 illustrates a third magnetic intensity modulated embodiment of a LPOS encoded timing based servo band in accordance with the present invention;

FIG. 31 illustrates a fourth magnetic intensity modulated embodiment of a LPOS encoded timing based servo band in accordance with the present invention;

FIG. 32 illustrates a third magnetic intensity/pattern interspacing modulated embodiment of a LPOS encoded timing based servo band in accordance with the present invention;

FIG. 33 illustrates a fourth magnetic intensity/pattern interspacing modulated embodiment of a LPOS encoded timing based servo band in accordance with the present invention;

FIGS. 38 & 39 respectively illustrate a front view and rear view of one embodiment of a tape drive in accordance with the present invention.

DETAILED DESCRIPTION OF THE PRESENT INVENTION

Figure 1:
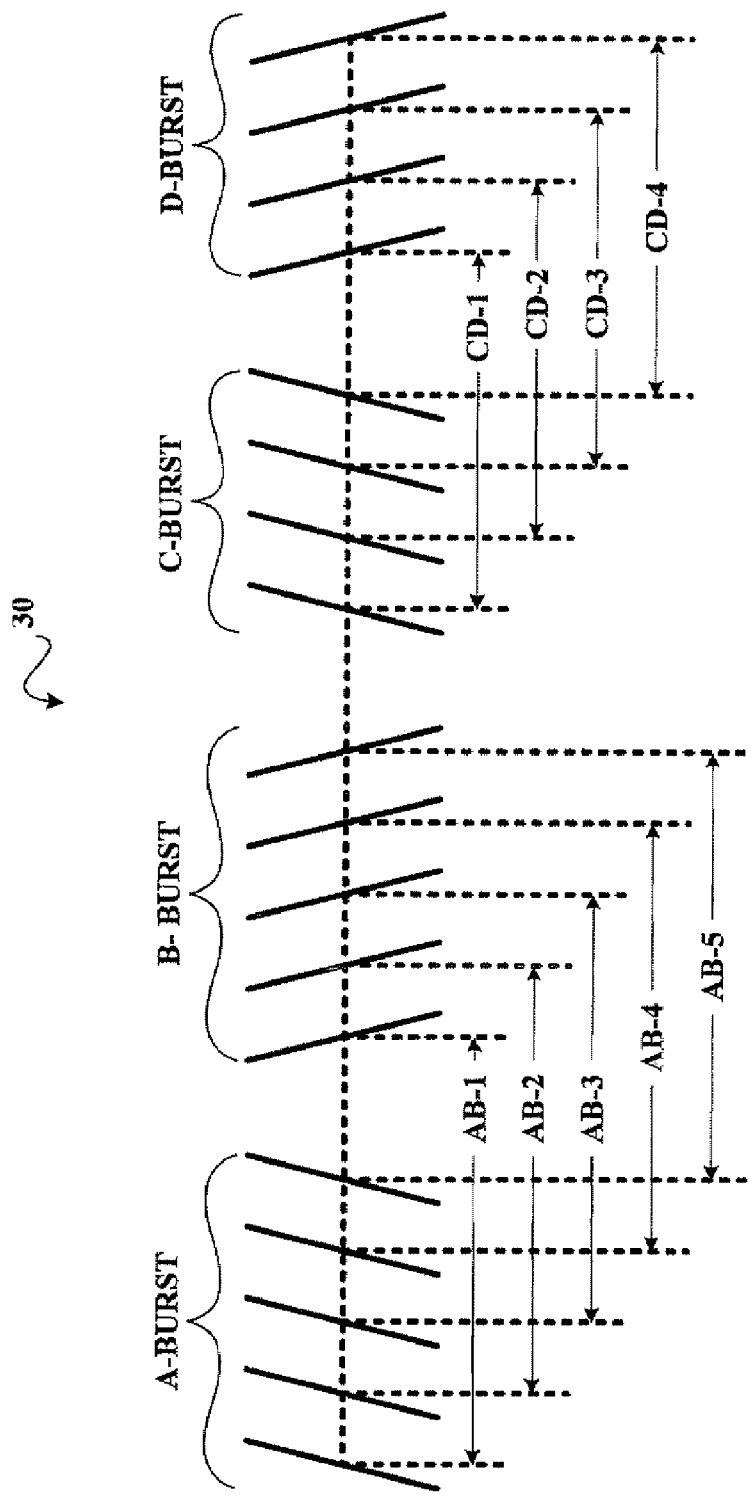
FIG. 1 illustrates an exemplary timing based servo pattern as known in the art.

FIG. 1 illustrates an exemplary timing based servo pattern 30 as known in the art. Timing based servo pattern 30 includes a standard A-burst of five (5) magnetic forward-slash stripes (/////), a standard B-burst of five (5) magnetic backward-slash stripes (\\\\\), a standard C-burst of four (4) magnetic forward-slash stripes (////) and a standard D-burst of four (4) magnetic backward-slash stripes (\\\\). A set of position error timings AB-1 to AB-5 are derived from a servo read of the A-burst and the B-burst as would be appreciated by those having ordinary skill in the art, and a set of position error timings CD-1 to CD-4 are derived from a servo read of the C-burst and the D-burst as would be appreciated by those having ordinary skill in the art.

Figure 2:
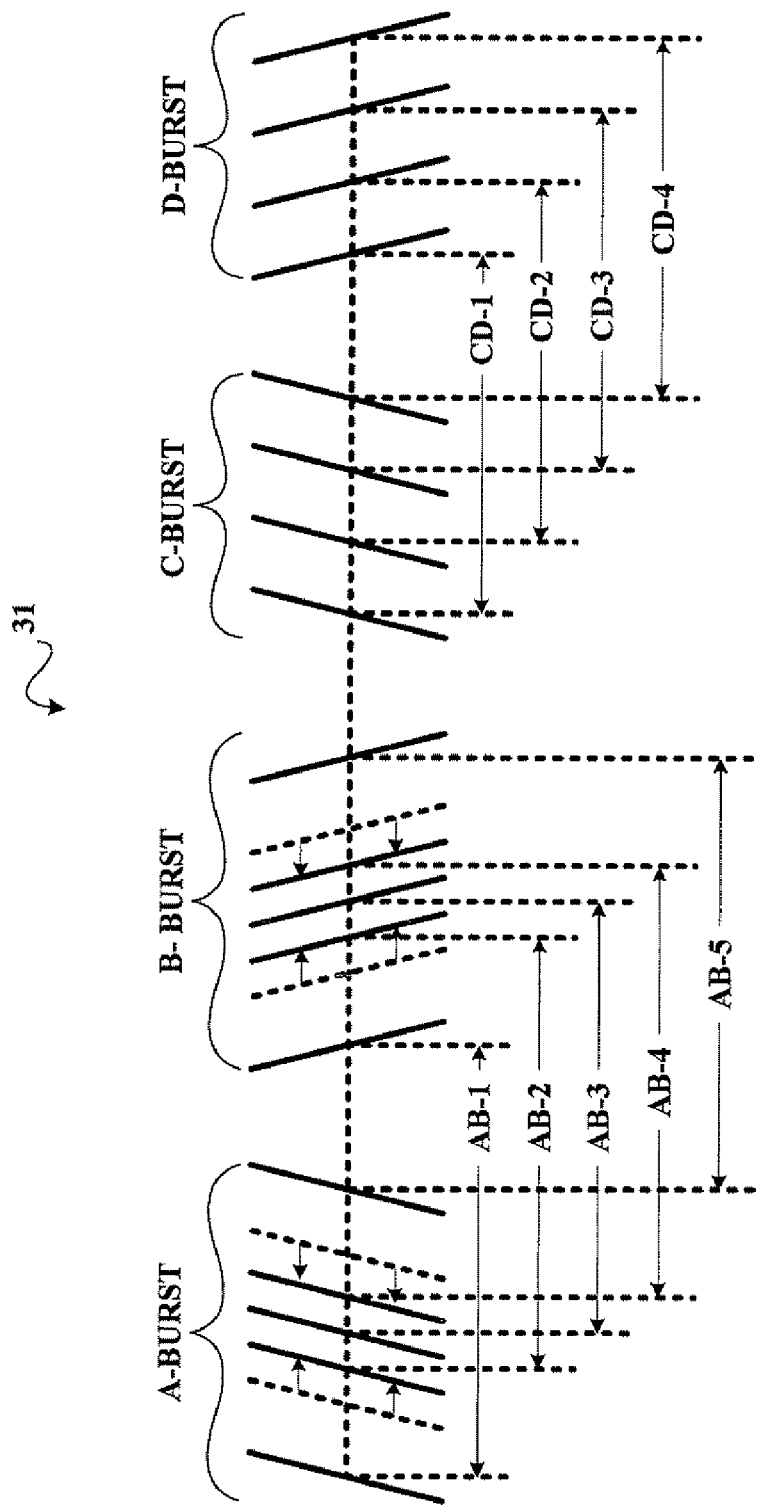
FIG. 2 illustrates an exemplary LPOS encoded binary "0" timing based servo pattern as known in the art.

To encode a binary digit 0 for LPOS purposes, a pattern 31 as shown in FIG. 2 is derived from pattern 30 (FIG. 1) whereby a second magnetic forward-slash stripe and a fourth magnetic forward-slash stripe of the A-burst are shifted closer to a middle (third) magnetic forward-slash stripe of the A-burst, and a second magnetic backward-slash stripe and a fourth magnetic backward-slash stripe of the B-burst are shifted closer to a middle (third) magnetic forward-slash stripe of the B-burst.

Figure 3:
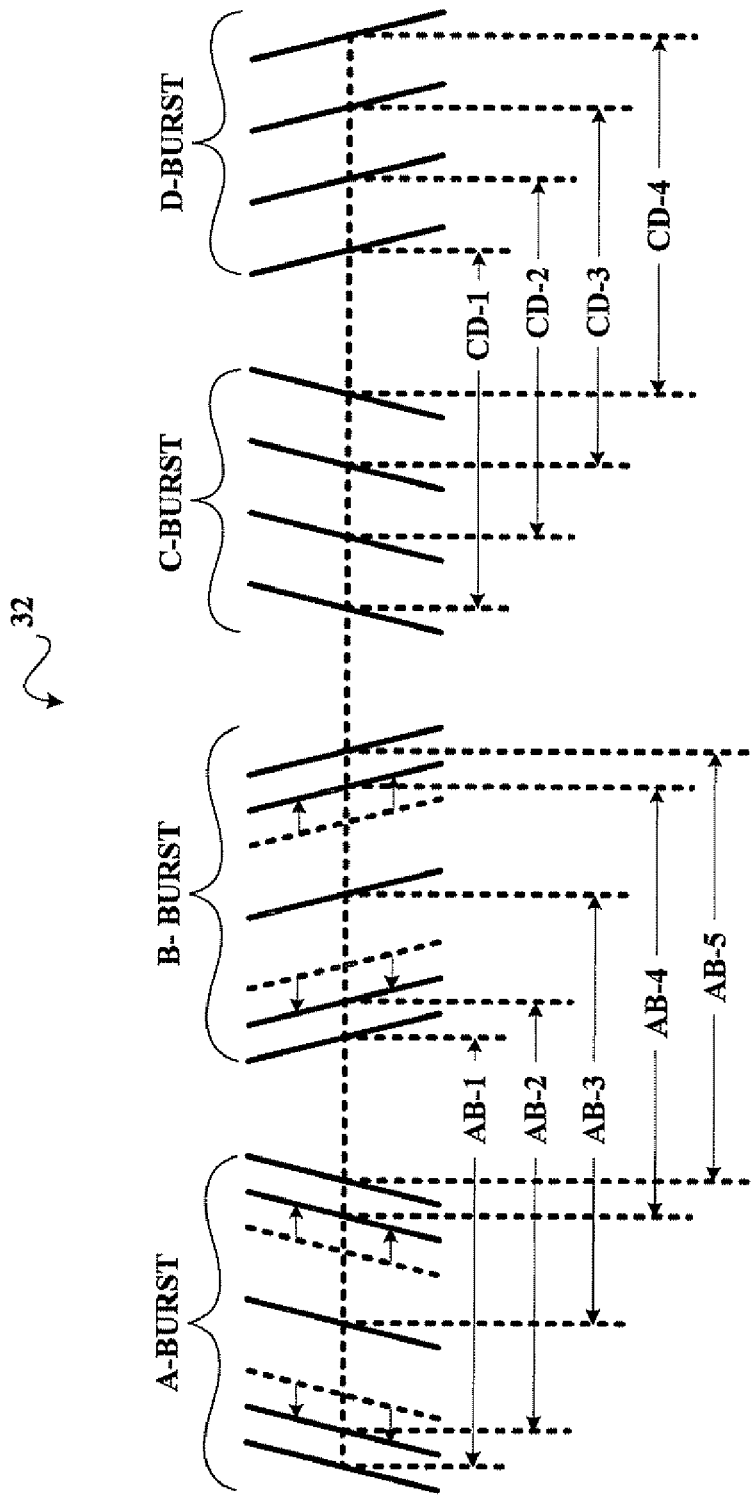
FIG. 3 illustrates an exemplary LPOS encoded binary "1" timing based servo pattern as known in the art.

To encode a binary digit 1 for LPOS purposes, a pattern 32 as shown in FIG. 3 is derived from pattern 30 (FIG. 1) whereby the second magnetic forward-slash stripe of the A-burst is shifted closer to a first magnetic forward-slash stripe of the A-burst and the fourth magnetic forward-slash stripe of the A-burst is shifted closer to a fifth magnetic forward-slash stripe of the A-burst, and the second magnetic backward-slash stripe of the B-burst is shifted closer to a first magnetic backward-slash stripe of the B-burst and the fourth magnetic backward-slash stripe of the B-burst is shifted closer to a fifth magnetic backward-slash stripe of the B-burst.

Figure 4:
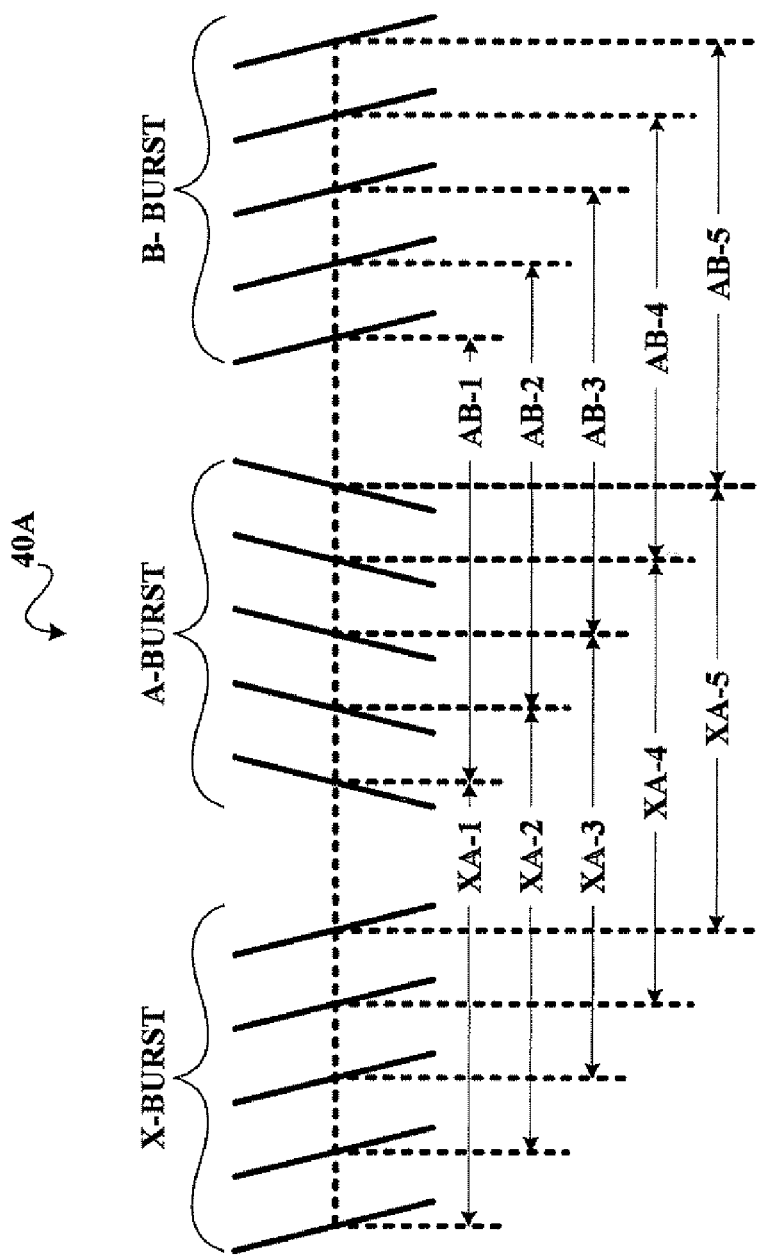
FIGS. 4 and 5 illustrate an exemplary differential timing based servo pattern as known in the art.
Figure 5:
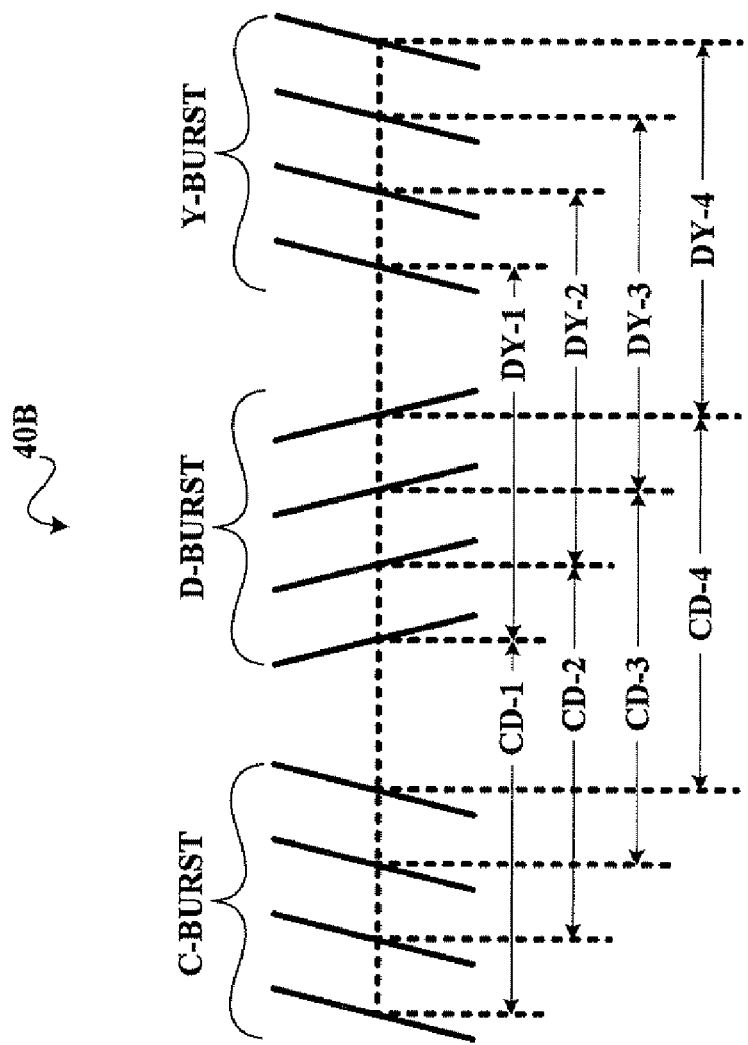

FIGS. 4 and 5 illustrate an exemplary differential timing based servo pattern 40 as known in the art. Differential timing based servo pattern 40 includes a standard X-burst of five (5) magnetic backward-slash stripes, standard A-burst of five (5) magnetic forward-slash stripes (/////) and a standard B-burst of five (5) magnetic backward-slash stripes (\\\\\) as shown in FIG. 4, and a standard C-burst of four (4) magnetic forward-slash stripes (////), a standard D-burst of four (4) magnetic backward-slash stripes (\\\\) and a standard Y-burst of four (4) magnetic forward-slash stripes (////) as shown in FIG. 5. A set of position error timings XA-1 to XA-5 and AB-1 to AB-5 are derived from a servo read of the X-burst, the A-burst and the B-burst as would be appreciated by those having ordinary skill in the art, and a set of position error timings CD-1 to CD-4 and DY-1 to DY-4 are derived from a servo read of the C-burst, the D-burst and the Y-burst as would be appreciated by those having ordinary skill in the art.

Figure 6:
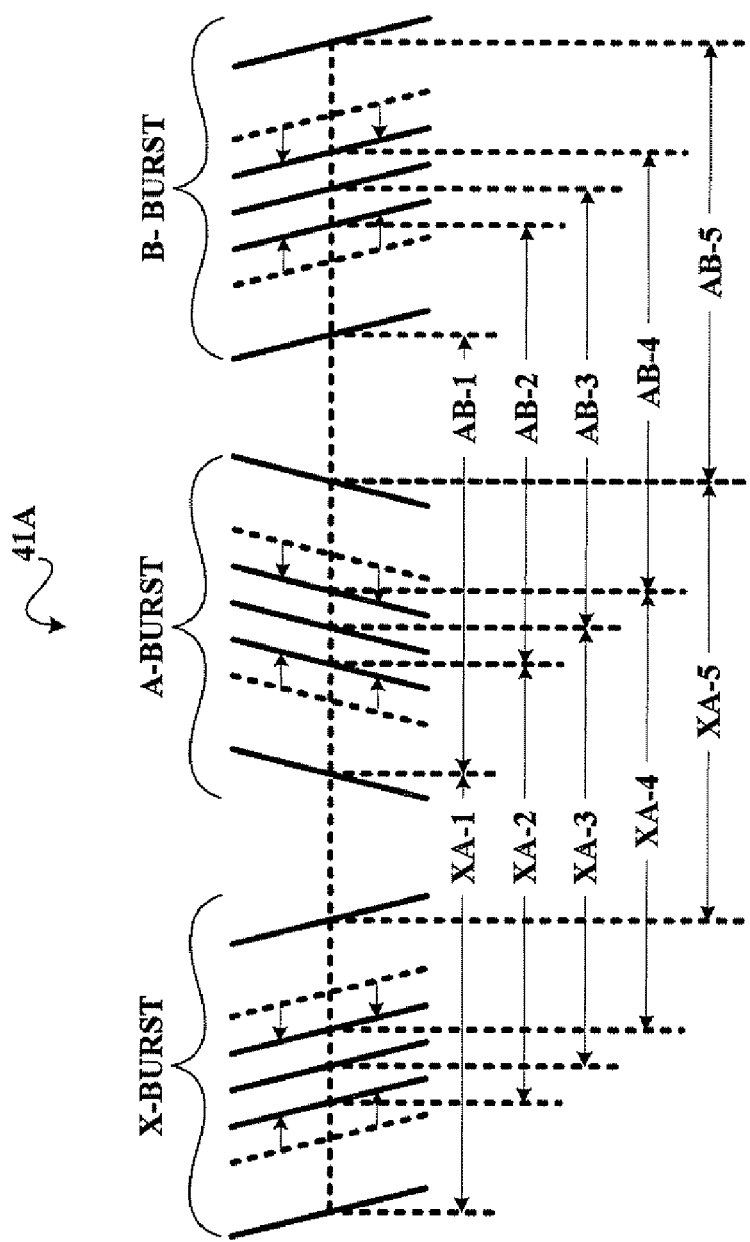
FIG. 6 illustrates an exemplary LPOS encoded binary "0" differential timing based servo pattern as known in the art.

To encode a binary digit 0 for LPOS purposes, a pattern 41 as shown in FIG. 6 is derived from pattern 40 (FIG. 4) whereby (1) a second magnetic backward-slash stripe and a fourth magnetic backward-slash stripe of the X-burst are shifted closer to a middle (third) magnetic forward-slash stripe of the X-burst, (2) a second magnetic forward-slash stripe and a fourth magnetic forward-slash stripe of the A-burst are shifted closer to a middle (third) magnetic forward-slash stripe of the A-burst, and (3) a second magnetic backward-slash stripe and a fourth magnetic backward-slash stripe of the B-burst are shifted closer to a middle (third) magnetic forward-slash stripe of the B-burst.

Figure 7:
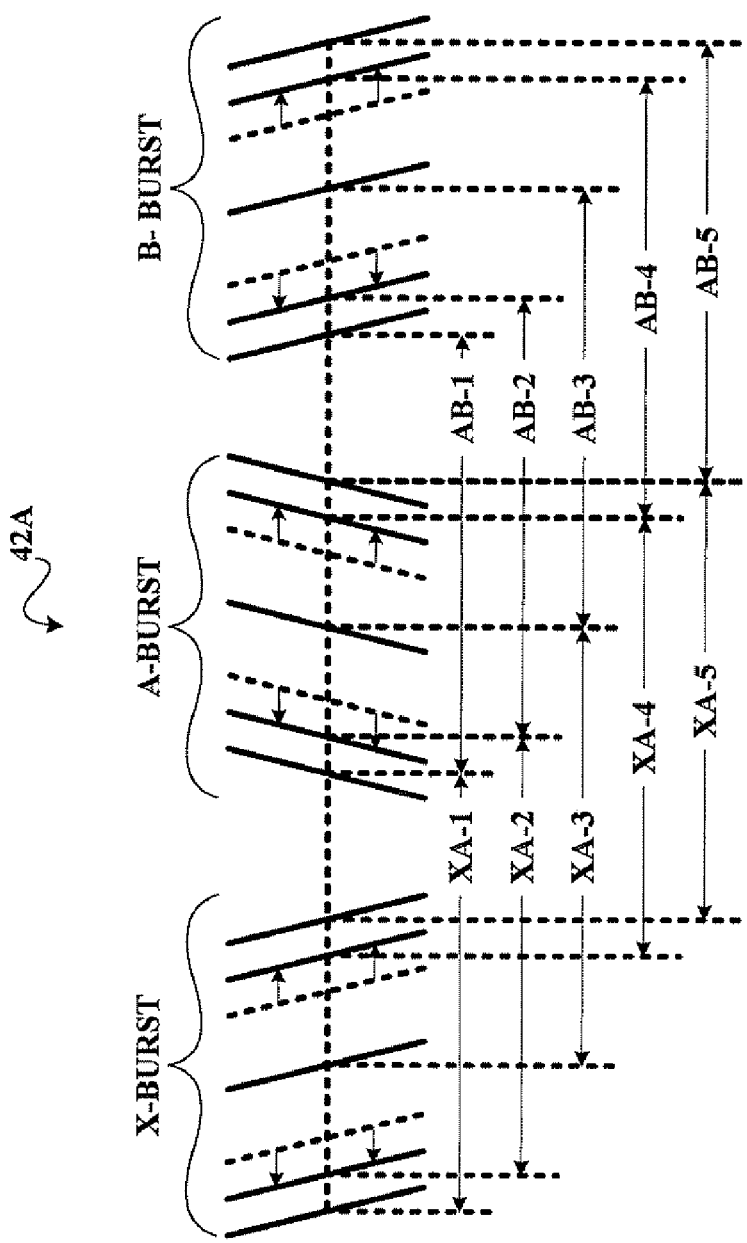
FIG. 7 illustrates an exemplary LPOS encoded binary "1" differential timing based servo pattern as known in the art.

To encode a binary digit 1 for LPOS purposes, a pattern 42 as shown in FIG. 7 is derived from pattern 40 (FIG. 4) whereby (1) the second magnetic backward-slash stripe of the X-burst is shifted closer to a first magnetic backward-slash stripe of the X-burst and the fourth magnetic backward-slash stripe of the X-burst is shifted closer to a fifth magnetic backward-slash stripe of the X-burst, (2) the second magnetic forward-slash stripe of the A-burst is shifted closer to a first magnetic forward-slash stripe of the A-burst and the fourth magnetic forward-slash stripe of the A-burst is shifted closer to a fifth magnetic forward-slash stripe of the A-burst, and (3) the second magnetic backward-slash stripe of the B-burst is shifted closer to a first magnetic backward-slash stripe of the B-burst and the fourth magnetic backward-slash stripe of the B-burst is shifted closer to a fifth magnetic backward-slash stripe of the B-burst.

FIG. 8 illustrates a timing based servo band 50 having a base string of six (6) timing based servo patterns 30 (FIG. 1) equally spaced by an interspace distance D1 along a track segment TS, and FIG. 9 illustrates a timing based servo band 51 having a LPOS encoded string of three (3) timing based servo patterns 31 (FIG. 2) followed by three (3) timing based servo patterns 31 (FIG. 3), all recorded on track segment TS, whereby all of the patterns 31 and 32 are equally spaced by interspace distance D1 along track segment TS. While the timing based servo pattern strings of bands 50 and 51 have proven to be of beneficial use for servo systems, the present invention is premised on expanding the scope of useful timing based servo pattern strings, particularly for LPOS servo purposes.

Specifically, the present invention is premised on modulating one or more physical parameters of a timing based servo pattern string for purposes of primarily providing a LPOS encoding of the timing based servo pattern string. In practice, the present invention does not impose any limitations or any restrictions as to the type of timing based servo pattern or patterns are incorporated within a timing based servo pattern string, as to which physical parameters of a timing based servo pattern string are modulated and as to what degree a physical parameter of a timing based servo pattern string is modulated. As such, the following description of exemplary embodiments of modulated timing based servo pattern strings of the present invention as shown in FIGS. 10-21 does not unduly limit nor restrict the timing based servo pattern string modulation scope of the present invention.

Figure 10:
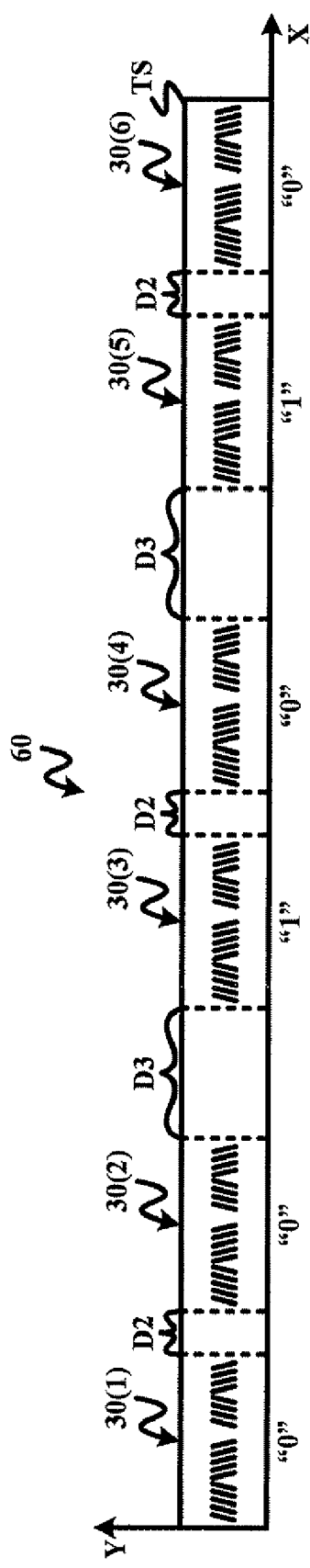
FIG. 10 illustrates a first pattern interspace modulated embodiment of a LPOS encoded timing based servo band in accordance with the present invention.

FIG. 10 illustrates a pattern interspacing modulation in accordance with the present invention of a timing based servo band 60 having a timing based pattern string of six (6) timing based servo patterns 30 (FIG. 1) recorded on a track segment TS. Generally, an interspacing between the patterns 30 is continually modulated to thereby obtain a LPOS encoding of band 60. Specifically, an interspace distance D2 between two consecutive patterns 30 equals one-half of interspace distance D1 (FIGS. 8 and 9) to thereby encode the succeeding pattern 30 as a bit "0", and an interspace distance D3 between two consecutive patterns 30 equals twice interspace distance D1 (FIGS. 8 and 9) to thereby encode the succeeding pattern 30 as a bit "1". Thus, assuming the first pattern 30 is encoded as a "0", then band 60 has a "001010" LPOS encoding based on the modulated interspacing between patterns 30.

Figure 11:
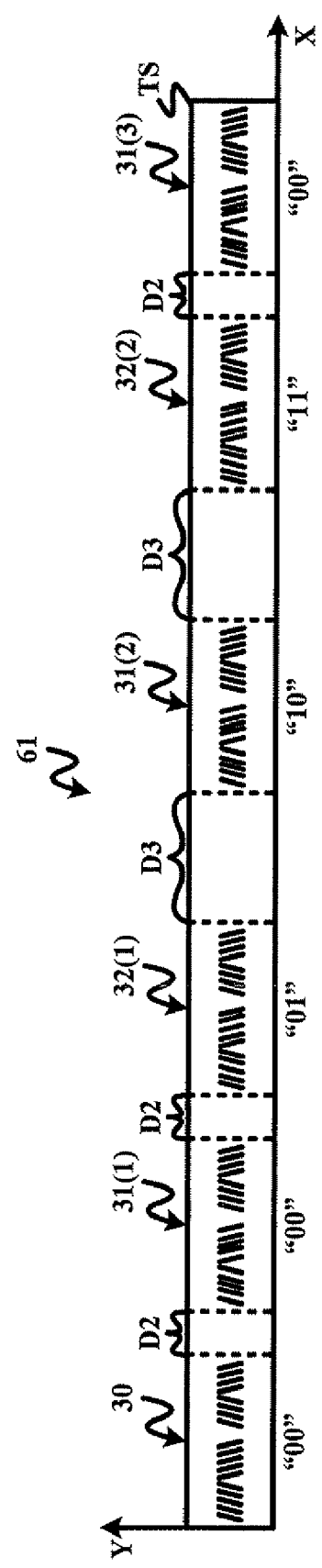
FIG. 11 illustrates a second pattern interspace modulated embodiment of a LPOS encoded timing based servo band in accordance with the present invention.

FIG. 11 illustrates a pattern interspacing modulation in accordance with the present invention of a timing based servo band 61 having a timing based servo string recorded on a track segment TS with a sequence of a timing based servo pattern 30 (FIG. 1), a first timing based servo pattern 31 (FIG. 2), a first timing based servo pattern 32 (FIG. 3), a second timing based servo pattern 31, a second timing based servo pattern 32, and a third and final timing based servo pattern 31. Generally, an interspacing between the patterns 30-32 is continually modulated to thereby obtain a more extensive LPOS encoding of band 61 as opposed to band 60 (FIG. 10). Specifically, interspace distance D2 between two consecutive patterns 30 equals one-half of interspace distance D1 (FIGS. 8 and 9) to thereby encode a first bit of the succeeding pattern 30 as a bit "0", and interspace distance D3 between two consecutive patterns 30 equals twice interspace distance D1 (FIGS. 8 and 9) to thereby encode a first bit of the succeeding pattern 30 as a bit "1". Thus, assuming the first pattern 30 is encoded as a "00" and the second bit of each pattern 31 and 32 is encoded in accordance with its individual LPOS encoding, then band 61 has a "000001101100" LPOS encoding based on the modulated interspacing between patterns 30-32 and the individual LPOS encoding of patterns 31 and 32.

FIG. 12 illustrates a pattern interspacing modulation in accordance with the present invention of a timing based servo band 62 having a timing based pattern string of six (6) timing based servo patterns 30 (FIG. 1) recorded on a track segment TS. Generally, an interspacing between the patterns 30 is intermittently modulated to thereby obtain a LPOS encoding of band 62. Specifically, interspace distance D2 between two consecutive patterns 30 equals one-half of interspace distance D1 (FIGS. 8 and 9) to thereby encode the succeeding pattern 30 as a bit "0", interspace distance D3 between two consecutive patterns 30 equals twice interspace distance D1 (FIGS. 8 and 9) to thereby encode the succeeding pattern 30 as a bit "1", and interspace distance D1 represents a continuation of the encoding from the previous pattern 30 to the succeeding pattern 30. Thus, assuming the first pattern 30 is encoded as a "0", then band 62 has a "000011" LPOS encoding based on the modulated interspacing between patterns 30.

FIG. 13 illustrates a pattern interspacing modulation in accordance with the present invention of a timing based servo band 63 having a timing based servo string recorded on a track segment TS with a sequence of a timing based servo pattern 30 (FIG. 1), a first timing based servo pattern 31 (FIG. 2), a first timing based servo pattern 32 (FIG. 3), a second timing based servo pattern 31, a third timing based servo pattern 31, and a second and final timing based servo pattern 32. Generally, an interspacing between the patterns 30-32 is intermittently modulated to thereby obtain a more extensive LPOS encoding of band 63 as opposed to band 62 (FIG. 12). Specifically, interspace distance D2 between two consecutive patterns equals one-half of interspace distance D1 (FIGS. 8 and 9) to thereby encode a first bit of the succeeding pattern as a bit "0", interspace distance D3 between two consecutive patterns equals twice interspace distance D1 (FIGS. 8 and 9) to thereby encode a first bit of the succeeding pattern 30 as a bit "1", and interspace distance D1 represents a continuation of the encoding from the previous pattern to the succeeding pattern. Thus, assuming the first pattern 30 is encoded as a "00" and the second bit of each pattern 31 and 32 is encoded in accordance with its individual LPOS encoding, then band 63 has a "000001001011" LPOS encoding based on the modulated interspacing between patterns 30-32 and the individual LPOS encodings of patterns 31 and 32.

Figure 14:
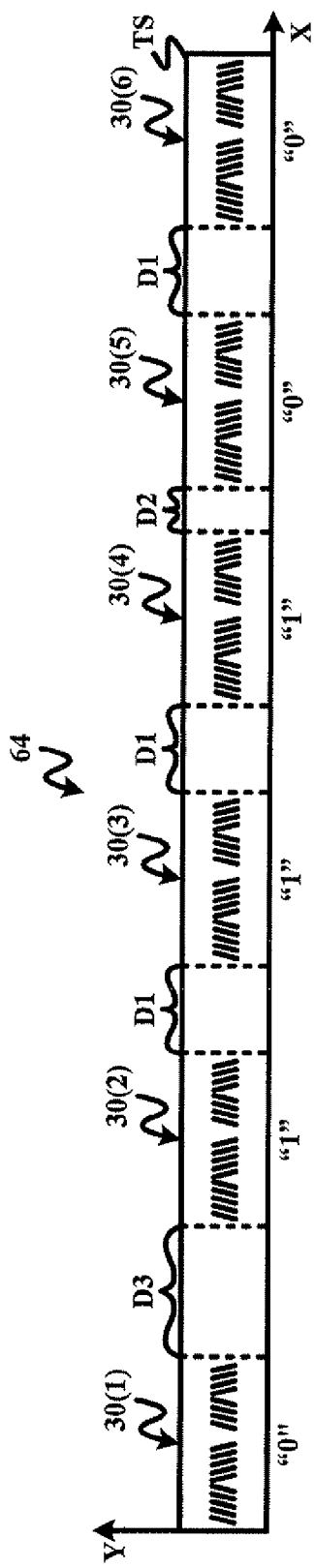
FIG. 14 illustrates a fifth pattern interspace modulated embodiment of a LPOS encoded timing based servo band in accordance with the present invention.

FIG. 14 illustrates a pattern interspacing modulation in accordance with the present invention of a timing based servo band 64 having a timing based pattern string of six (6) timing based servo patterns 30 (FIG. 1) recorded on a track segment TS. Generally, an interspacing between the patterns 30 is intermittently modulated to thereby obtain a LPOS encoding of band 64. Specifically, interspace distance D2 between two consecutive patterns 30 equals one-half of interspace distance D1 to thereby encode the succeeding pattern 30 as a bit "0", interspace distance D3 between two consecutive patterns 30 to thereby encode the succeeding pattern 30 as a bit "1", and interspace distance D1 represents a continuation of the encoding from the previous pattern 30 to the succeeding pattern 30. Thus, assuming the first pattern 30 is encoded as a "0", then band 64 has a "011100" LPOS encoding based on the modulated interspacing between patterns 30.

Figure 15:
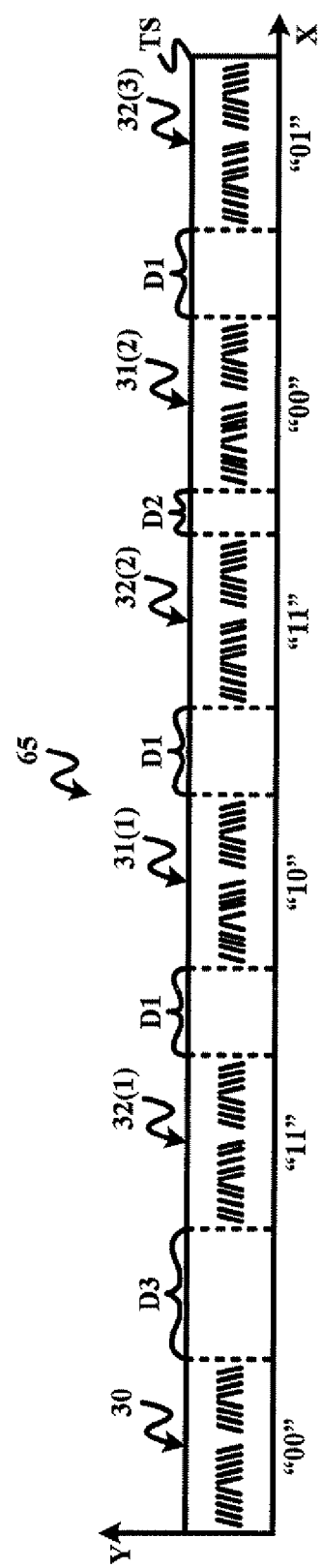
FIG. 15 illustrates a sixth pattern interspace modulated embodiment of a LPOS encoded timing based servo band in accordance with the present invention.

FIG. 15 illustrates a pattern interspacing modulation in accordance with the present invention of a timing based servo band 65 having a timing based servo string recorded on a track segment TS with a sequence of a timing based servo pattern 30 (FIG. 1), a first timing based servo pattern 32 (FIG. 3), a first timing based servo pattern 31 (FIG. 3), a second timing based servo pattern 32, a second timing based servo pattern 31, and a third final timing based servo pattern 32. Generally, an interspacing between the patterns 30-32 is intermittently modulated to thereby obtain a more extensive LPOS encoding of band 65 as opposed to band 64 (FIG. 14). Specifically, interspace distance D2 between two consecutive patterns to encode a first bit of the succeeding pattern as a bit "0", interspace distance D3 between two consecutive patterns equals twice interspace distance D1 (FIGS. 8 and 9) to encode a first bit of the succeeding pattern 30 as a bit "1", and interspace distance D1 represents a continuation of the encoding from the previous pattern to the succeeding pattern. Thus, assuming the first pattern 30 is encoded as a "00" and the second bit of each pattern 31 and 32 is encoded in accordance with its individual LPOS encoding, then band 65 has a "0011101100001" LPOS encoding based on the modulated interspacing between patterns 30-32 and the individual LPOS encodings of patterns 31 and 32.

Figure 16:
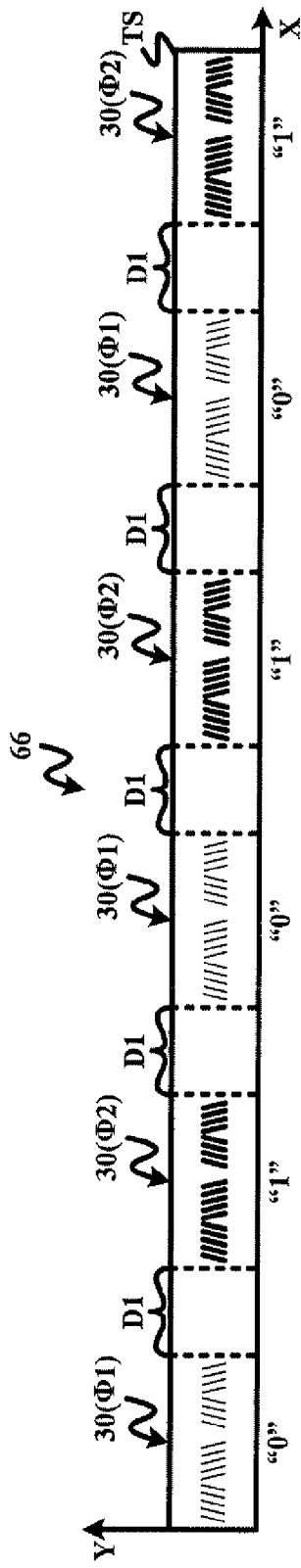
FIG. 16 illustrates a first magnetic intensity modulated embodiment of a LPOS encoded timing based servo band in accordance with the present invention.

FIG. 16 illustrates a magnetic intensity modulation in accordance with the present invention of a timing based servo band 66 having a timing based pattern string of six (6) timing based servo patterns 30 (FIG. 1) recorded on a track segment TS. Generally, each pattern 30 is formed with one of two or more magnetic intensities to thereby provide a LPOS encoding of the pattern. Specifically, a magnetic intensity of Φ1 encodes each corresponding pattern 30 as a bit "0" and a magnetic intensity of Φ2 encodes each corresponding pattern 30 as a bit "1", with magnetic intensity Φ1 being less than magnetic intensity Φ2 as represented by the thickness of the corresponding bursts. Thus, band 66 has a "010101" LPOS encoding based on the modulated magnetic intensities of the patterns 30.

Figure 17:
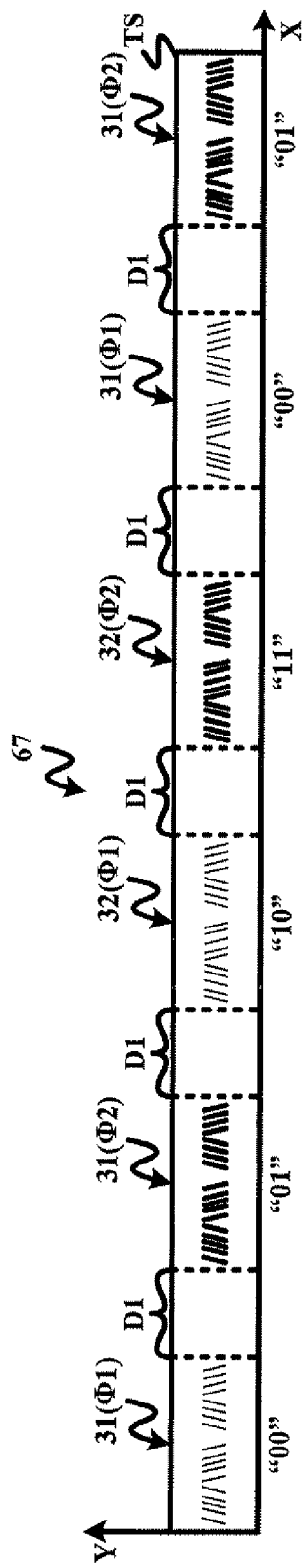
FIG. 17 illustrates a second magnetic intensity modulated embodiment of a LPOS encoded timing based servo band in accordance with the present invention.

FIG. 17 illustrates a magnetic intensity modulation in accordance with the present invention of a timing based servo band 67 having a timing based pattern string recorded of a track segment TS with a sequence of two timing based servo patterns 31 (FIG. 2), two timing based servo patterns 32 (FIG. 3) and two timing based servo patterns 31. Generally, each pattern 31 and 32 is formed with one of two or more magnetic intensities to thereby provide a LPOS encoding of a last bit of the pattern while a first bit of the pattern is encoded in accordance with an individual LPOS encoding of each pattern 31 and 32. Specifically, a magnetic intensity of Φ1 encodes each corresponding pattern 31 and 32 as a bit "0" and a magnetic intensity of Φ2 encodes each corresponding pattern 31 and 32 as a bit "1", with magnetic intensity Φ1 being less than magnetic intensity Φ2 as represented by the thickness of the corresponding bursts. Thus, band 67 has a "000110110001" LPOS encoding based on both the modulated magnetic intensities and the individual LPOS encodings of the patterns 31 and 32.

FIG. 18 illustrates a magnetic intensity/pattern interspacing modulation in accordance with the present invention of a timing based servo band 68 having a timing based pattern string of six (6) timing based servo patterns 30 (FIG. 1) recorded on a track segment TS. Generally, each pattern 30 is formed with one of two or more magnetic intensities to thereby provide a LPOS encoding of a last bit of the pattern 30 and a pattern interspacing modulation as described in connection with FIG. 10 is applied to encode the first bit of each pattern 30. Specifically, a magnetic intensity of Φ1 encodes a pattern 30 as a bit "0" and a magnetic intensity of Φ2 encodes a pattern 30 as a bit "1", with magnetic intensity Φ1 being less than magnetic intensity Φ2 as represented by the thickness of the corresponding bursts. Thus, band 68 has a "000001101100" LPOS encoding based on the modulated magnetic intensities and pattern interspacing of the patterns 30.

FIG. 19 illustrates a magnetic intensity/pattern interspacing modulation in accordance with the present invention of a timing based servo band 69 having a timing based pattern string of six (6) timing based servo patterns 30 (FIG. 1) recorded on a track segment TS. Generally, each pattern 30 is formed with one of two or more magnetic intensities to thereby provide a LPOS encoding of a last bit of the pattern 30 and a pattern interspacing modulation as described in connection with FIGS. 12 and 14 is applied to encode the first bit of each pattern 30. Specifically, a magnetic intensity of Φ1 encodes a pattern 30 as a bit "0" and a magnetic intensity of Φ2 encodes a pattern 30 as a bit "1", with magnetic intensity Φ1 being less than magnetic intensity Φ2 as represented by the thickness of the corresponding bursts. Thus, band 69 has a "000001101100" LPOS encoding based on the modulated magnetic intensities and pattern interspacing of the patterns 30.

Referring to FIGS. 18 and 19, further magnetic intensity/pattern interspacing modulated embodiments of the present invention can involve a LPOS encoding of pattern 30 of bands 68 and 69 as patterns 31 (FIG. 2) and 32 (FIG. 3) to thereby introduce an additional bit per pattern for three bits per pattern that results in a more extensive LPOS encoding as compared to the LPOS encoding of bands 68 and 69.

Figure 20:
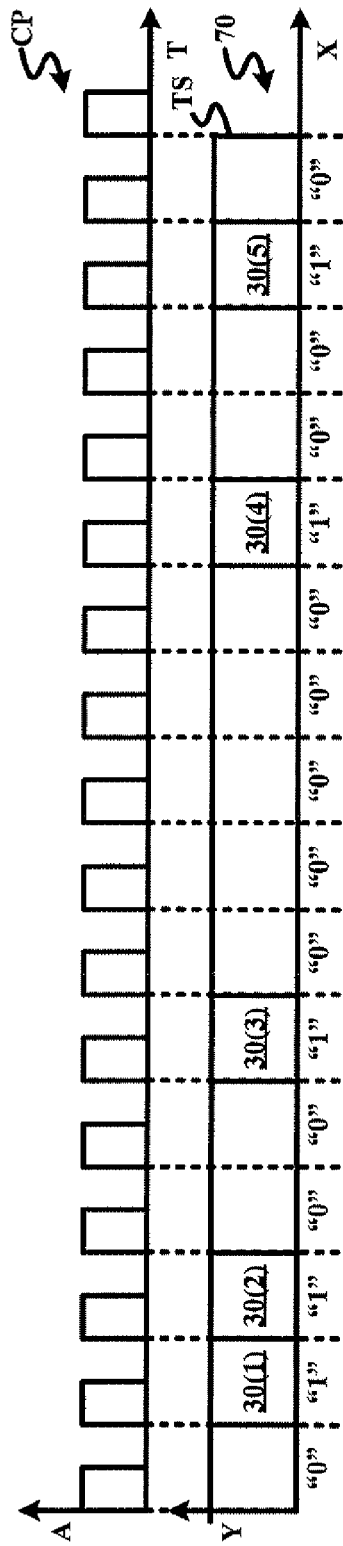
FIG. 20 illustrates a first pulse position modulated embodiment of a LPOS encoded timing based servo band in accordance with the present invention.

FIG. 20 illustrates a pulse position modulation in accordance with the present invention of a timing based servo band 70 having a timing based pattern string of six (6) timing based servo patterns 30 (FIG. 1) recorded on a track segment TS. Generally, patterns 30 are sparely positioned relative to a set of clock pulses CP to LPOS encode band 70. Specifically, a pulse position exclusive of a pattern 30 is encoded as a bit "0" and a pulse position inclusive of a pattern 30 is encoded as a bit "1". Thus, 70 has a "0110010000010010" LPOS encoding based on the modulated pulse positioning of the patterns 30. For this embodiment, a run-length-limit indicative of a maximum number of encoded "0" bits between "1" bits can be established to thereby minimize a count of "0" bits between "1" bits whereby the clock pulses between patterns 30 can be easily and efficiently counted. Furthermore, a band derived from band 70 based on a magnetic intensity modulation of patterns 30 of band 70 introduces an additional bit per pattern for two bits per pattern that results in a more extensive LPOS encoding than band 70.

Figure 21:
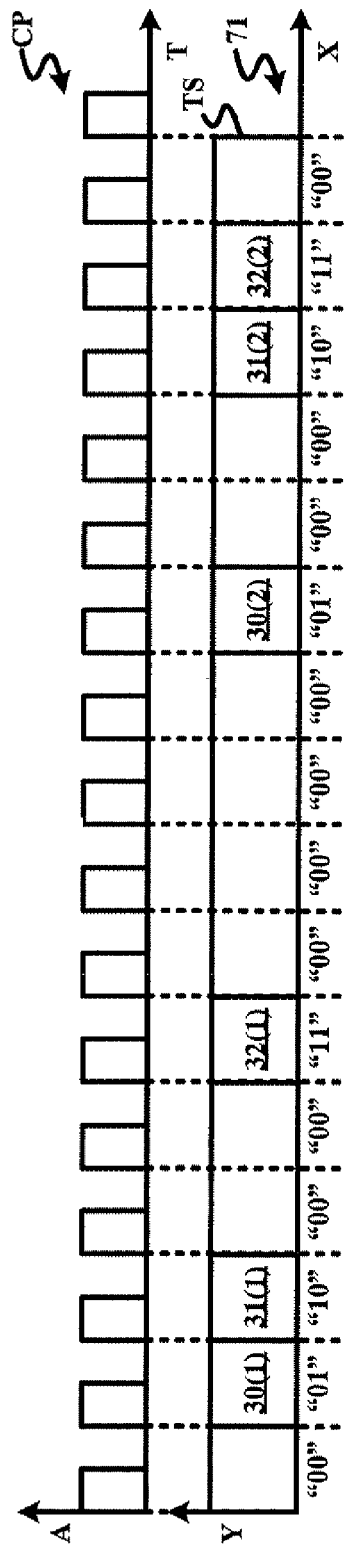
FIG. 21 illustrates a second pulse position modulated embodiment of a LPOS encoded timing based servo band in accordance with the present invention.

FIG. 21 illustrates a pulse position modulation in accordance with the present invention of a timing based servo band 71 having a timing based pattern string recorded on a track segment TS with a sequence of a first timing based servo pattern 30, a first timing based servo pattern 31, a first timing based servo pattern 32, a second timing based servo pattern 30, a second timing based servo pattern 31, and a second timing based servo pattern 32. Generally, each pattern is sparely positioned relative to a set of clock pulses CP to LPOS encode band 71. Specifically, a pulse position exclusive of a pattern is encoded as a bit "00", a pulse position inclusive of a pattern 30 is encoded as a bit "01", a pulse position inclusive of a pattern 31 is encoded as a bit "10", and a pulse position inclusive of a pattern 32 is encoded as a bit "11". Thus, band 71 had a "000110000011000000000010001011100" LPOS encoding based on the modulated pulse positioning of the patterns and the LPOS encoding of the patterns. Again, for this embodiment, a run-length-limit indicative of a maximum number of encoded "00" bits between the other bits can be established to thereby minimize a count of "0" bits between the other bits whereby the clock pulses between patterns can be easily and efficiently counted. Furthermore, a band derived from band 71 based on a magnetic intensity modulation of patterns 30-32 of band 71 introduces an additional bit per pattern for three bits per pattern that results in a more extensive LPOS encoding than band 71.

Figure 23:
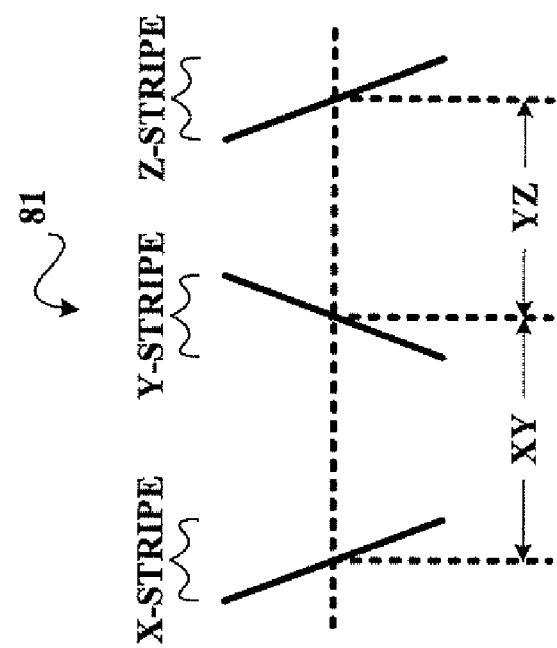
FIG. 23 illustrates a second embodiment of a differential timing based servo pattern in accordance with the present invention.
Figure 22:
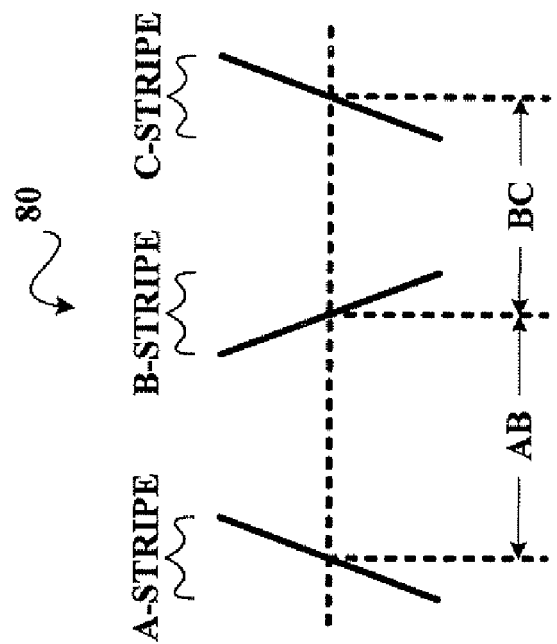
FIG. 22 illustrates a first embodiment of a differential timing based servo pattern in accordance with the present invention.

While FIGS. 10-21 have been illustrated in the context of timing based servo patterns 30 (FIG. 1), 31 (FIG. 2) and pattern 32 (FIG. 3) to facilitate a straightforward understanding of the present invention, those having ordinary skill in the art will appreciate how to apply the inventive principles of the present invention to any other type of timing based servo patterns, such as, for example, the differential timing based servo patterns of FIGS. 4-7 and the differential timing based servo patterns of FIGS. 22 and 23.

Referring to FIG. 22, a differential timing based servo pattern 80 of the present invention sequentially includes an A-magnetic forward-slash stripe (/), a B-magnetic backward-slash stripe (\) and a C-magnetic forward-slash stripe (/). A set of position error timings AB and BC are derived from a servo read of the A-stripe, the B-stripe and the C-stripe as would be appreciated by those having ordinary skill in the art. Contrastingly, FIG. 23 illustrates a differential timing based servo pattern 81 of the present invention sequentially including an X-magnetic back-slash stripe (\), a Y-magnetic forward-slash stripe (/) and a Z-magnetic backward-slash stripe (\). A set of position error timings XY and YZ are derived from a servo read of the A-stripe, the B-stripe and the C-stripe as would be appreciated by those having ordinary skill in the art.

As will be appreciated by those having ordinary skill in the art from the following description of FIGS. 24-35, differential timing based servo patterns 80 and 81 were conceived as the ideal patterns to be employed within modulated differential timing based servo pattern strings of the present invention. Again, in practice, the present invention does not impose any limitations or any restrictions as to which physical parameters of a differential timing based servo pattern string are modulated and as to what degree a physical parameter of a differential timing based servo pattern string is modulated. Thus, the following descriptions of exemplary embodiments of modulated differential timing based servo pattern strings of the present invention as shown in FIGS. 24-35 does not unduly limit nor restrict the differential timing based servo pattern string modulation scope of the present invention.

Figure 24:
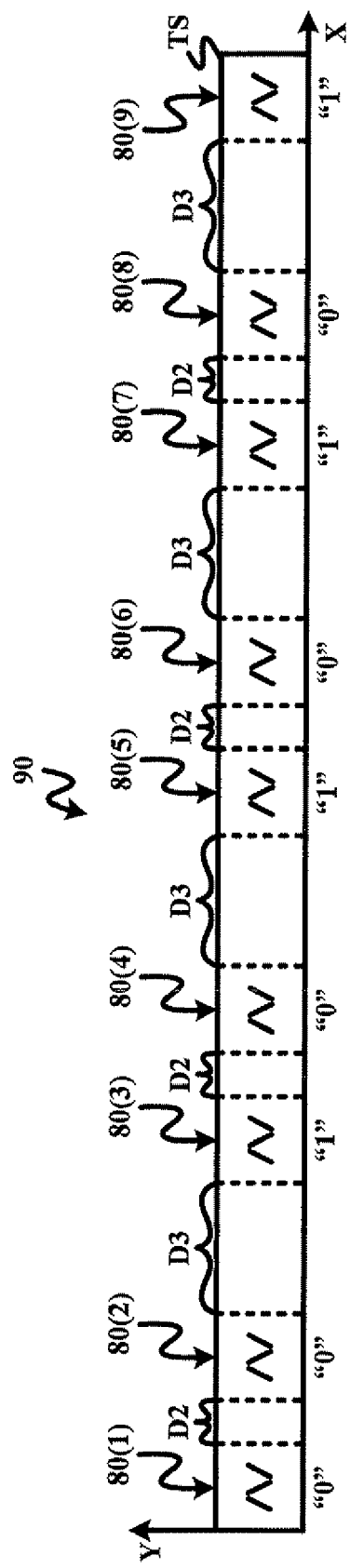
FIG. 24 illustrates a seventh pattern interspace modulated embodiment of a LPOS encoded timing based servo band in accordance with the present invention.

FIG. 24 illustrates a pattern interspacing modulation in accordance with the present invention of a differential timing based servo band 90 having a differential timing based pattern string of nine (9) differential timing based servo patterns 80 (FIG. 22) recorded on a track segment TS. Generally, an interspacing between the patterns 80 is continually modulated to thereby obtain a LPOS encoding of band 90. Specifically, an interspace distance D2 between two consecutive patterns 80 equals one-half of interspace distance D1 (FIGS. 8 and 9) to thereby encode the succeeding pattern 80 as a bit "0", and an interspace distance D3 between two consecutive patterns 80 equals twice interspace distance D1 (FIGS. 8 and 9) to thereby encode the succeeding pattern 80 as a bit "1". Thus, assuming the first pattern 80 is encoded as a "0", then band 90 has a "001010101" LPOS encoding based on the modulated interspacing between patterns 80.

Figure 25:
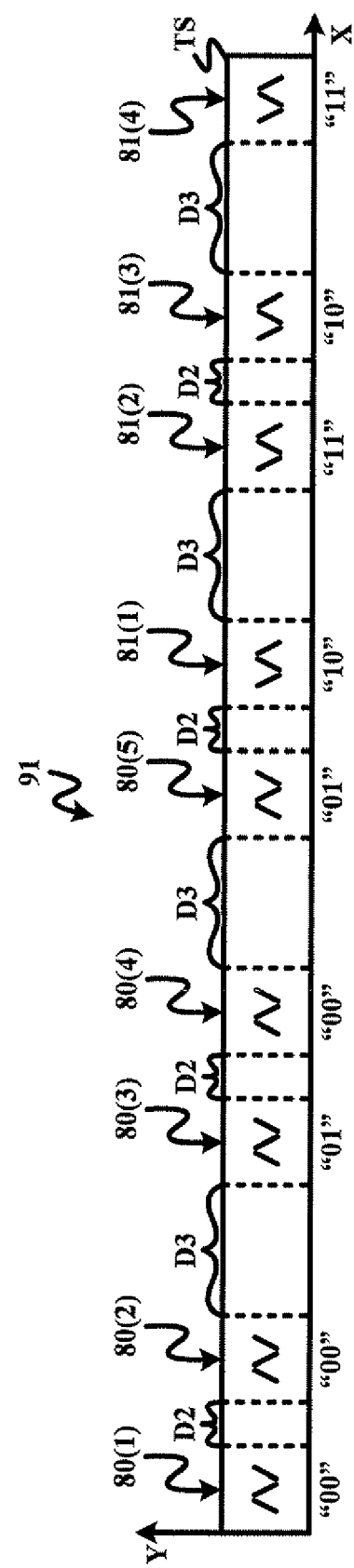
FIG. 25 illustrates an eighth pattern interspace modulated embodiment of a LPOS encoded timing based servo band in accordance with the present invention.

FIG. 25 illustrates a pattern interspacing modulation in accordance with the present invention of a differential timing based servo band 91 having a differential timing based servo string recorded on a track segment TS with a sequence of a five (5) differential timing based servo patterns 80 (FIG. 22) as a "0X" LPOS encoding and four (4) differential timing based servo patterns 81 (FIG. 23) as a "1X" LPOS encoding. Generally, an interspacing between the patterns 80 and 81 is continually modulated to thereby obtain a more extensive LPOS encoding of band 91 as opposed to band 90 (FIG. 24). Specifically, interspace distance D2 between two consecutive patterns 80 equals one-half of interspace distance D1 (FIGS. 8 and 9) to thereby encode a second bit of the succeeding pattern 80 as a bit "0", and interspace distance D3 between two consecutive patterns 80 equals twice interspace distance D1 (FIGS. 8 and 9) to thereby encode a second bit of the succeeding pattern 81 as a bit "1". Thus, assuming the first pattern 80 is LPOS encoded as a "00", then band 91 has a "000001000110111011" LPOS encoding based on the modulated interspacing between patterns 80 and 81 and the individual LPOS encoding of patterns 80 and 81.

Figure 26:
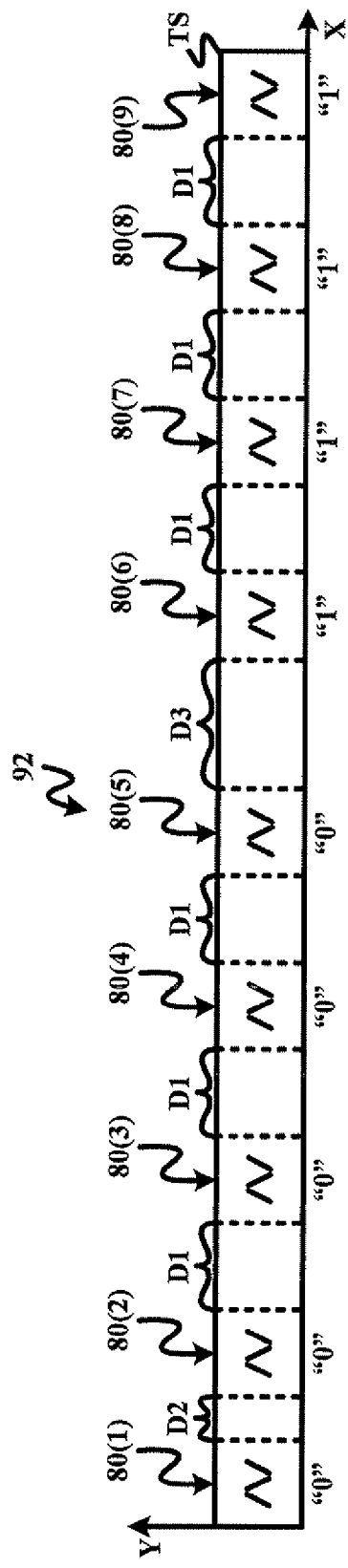
FIG. 26 illustrates a ninth pattern interspace modulated embodiment of a LPOS encoded timing based servo band in accordance with the present invention.

FIG. 26 illustrates a pattern interspacing modulation in accordance with the present invention of a differential timing based servo band 92 having a differential timing based pattern string of nine (9) differential timing based servo patterns 80 (FIG. 1) recorded on a track segment TS. Generally, an interspacing between the patterns 80 is intermittently modulated to thereby obtain a LPOS encoding of band 92. Specifically, interspace distance D2 between two consecutive patterns 80 equals one-half of interspace distance D1 (FIGS. 8 and 9) to thereby encode the succeeding pattern 80 as a bit "0", interspace distance D3 between two consecutive patterns 80 equals twice interspace distance D1 (FIGS. 8 and 9) to thereby encode the succeeding pattern 80 as a bit "1", and interspace distance D1 represents a continuation of the encoding from the previous pattern 80 to the succeeding pattern 80. Thus, assuming the first pattern 80 is encoded as a "0", then band 92 has a "000001111" LPOS encoding based on the modulated interspacing between patterns 80.

Figure 27:
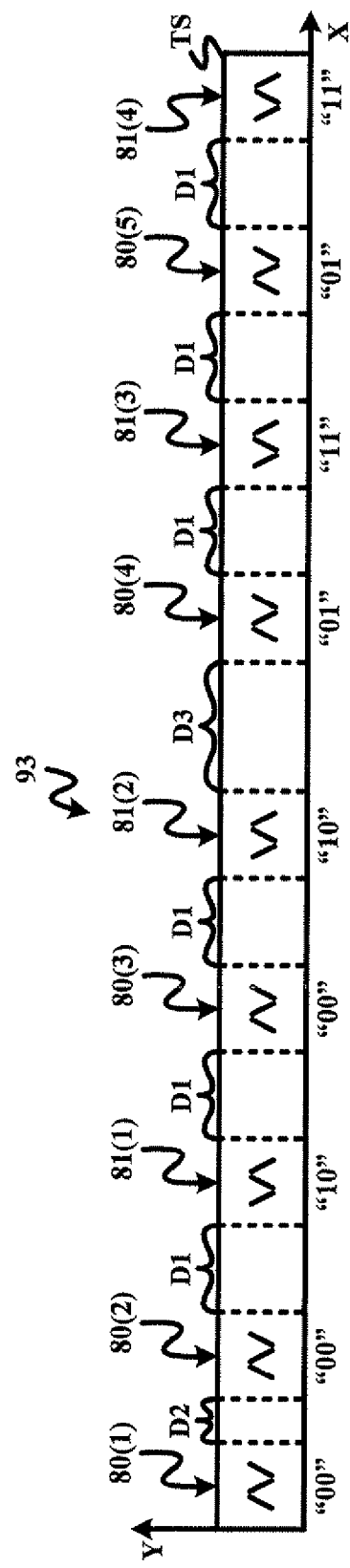
FIG. 27 illustrates a tenth pattern interspace modulated embodiment of a LPOS encoded timing based servo band in accordance with the present invention.

FIG. 27 illustrates a pattern interspacing modulation in accordance with the present invention of a differential timing based servo band 93 having a timed based servo string recorded on a track segment TS with a sequence of a first two differential timing based servo patterns 80 (FIG. 22), a first differential timing based servo pattern 81 (FIG. 23), a third differential timing based servo pattern 80, a second differential timing based servo pattern 81, a fourth differential timing based servo pattern 80, a third differential timing based servo pattern 81, a fifth differential timing based servo pattern 80, and a fourth and final differential timing based servo pattern 81. Generally, an interspacing between patterns 80 and 81 is intermittently modulated to thereby obtain a more extensive LPOS encoding of band 93 as opposed to band 92 (FIG. 26). Specifically, interspace distance D2 between two consecutive patterns equals one-half of interspace distance D1 (FIGS. 8 and 9) to thereby encode a second bit of the succeeding pattern as a bit "0", interspace distance D3 between two consecutive patterns equals twice interspace distance D1 (FIGS. 8 and 9) to thereby encode a second bit of the succeeding pattern 80 as a bit "1", and interspace distance D1 represents a continuation of the encoding from the previous pattern to the succeeding pattern. Thus, assuming the first pattern 80 is encoded as a "00", the first bit of each pattern 80 is encoded as a "0" bit, and the first bit of each pattern 81 is encoded as a "1" bit, then band 93 has a "000010001001110111" LPOS encoding based on the modulated interspacing between patterns 80 and 81 and the individual LPOS encodings of patterns 80 and 81.

Figure 28:
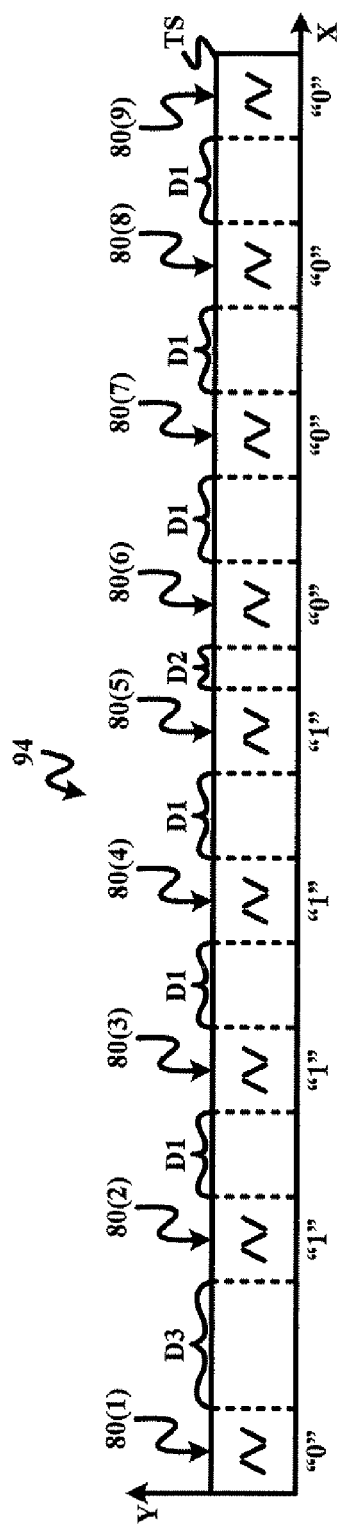
FIG. 28 illustrates an eleventh pattern interspace modulated embodiment of a LPOS encoded timing based servo band in accordance with the present invention.

FIG. 28 illustrates a pattern interspacing modulation in accordance with the present invention of a differential timing based servo band 94 having a differential timing based pattern string of nine (9) differential timing based servo patterns 80 (FIG. 22) recorded on a track segment TS. Generally, an interspacing between the patterns 80 is intermittently modulated to thereby obtain a LPOS encoding of band 94. Specifically, interspace distance D2 between two consecutive patterns 80 equals one-half of interspace distance D1 to thereby encode the succeeding pattern 80 as a bit "0", interspace distance D3 between two consecutive patterns 80 to thereby encode the succeeding pattern 80 as a bit "1", and interspace distance D1 represents a continuation of the encoding from the previous pattern 80 to the succeeding pattern 80. Thus, assuming the first pattern 80 is encoded as a "0", then band 94 has a "011110000" LPOS encoding based on the modulated interspacing between patterns 80.

Figure 29:
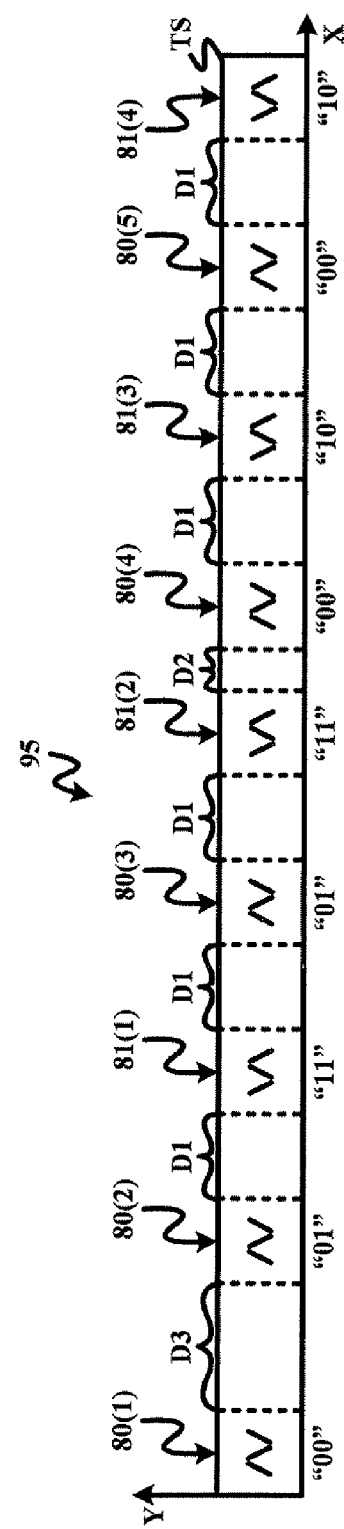
FIG. 29 illustrates a twelfth pattern interspace modulated embodiment of a LPOS encoded timing based servo band in accordance with the present invention.

FIG. 29 illustrates a pattern interspacing modulation in accordance with the present invention of a differential timing based servo band 95 having a timed based servo string recorded on a track segment TS with a sequence of a first two differential timing based servo patterns 80 (FIG. 22), a first differential timing based servo pattern 81 (FIG. 23), a third differential timing based servo pattern 80, a second differential timing based servo pattern 81, a fourth differential timing based servo pattern 80, a third differential timing based servo pattern 81, a fifth differential timing based servo pattern 80, and a fourth and final differential timing based servo pattern 81. Generally, an interspacing between the patterns 80 and 81 is intermittently modulated to thereby obtain a more extensive LPOS encoding of band 95 as opposed to band 94 (FIG. 14). Specifically, interspace distance D2 between two consecutive patterns to encode a second bit of the succeeding pattern as a bit "0", interspace distance D3 between two consecutive patterns equals twice interspace distance D1 (FIGS. 8 and 9) to encode a second bit of the succeeding pattern 80 as a bit "1", and interspace distance D1 represents a continuation of the encoding from the previous pattern to the succeeding pattern. Thus, assuming the first pattern 80 is encoded as a "00", the first bit of each pattern 80 is encoded as a "0" bit, and the first bit of each pattern 81 is encoded as a "1" bit, then band 95 has a "000111011100100010" LPOS encoding based on the modulated interspacing between patterns 80 and 81 and the individual LPOS encodings of patterns 80 and 81.

FIG. 30 illustrates a magnetic intensity modulation in accordance with the present invention of a differential timing based servo band 96 having a differential timing based pattern string of nine (9) differential timing based servo patterns 80 (FIG. 22) recorded on a track segment TS. Generally, each pattern 80 is formed with one of two or more magnetic intensities to thereby provide a LPOS encoding of the pattern. Specifically, a magnetic intensity of $\Phi 1$ encodes each corresponding pattern 80 as a bit "0" and a magnetic intensity of $\Phi 2$ encodes each corresponding pattern 80 as a bit "1", with magnetic intensity $\Phi 1$ being less than magnetic intensity $\Phi 2$ as represented by the thickness of the corresponding stripes. Thus, band 96 has a "010101010" LPOS encoding based on the modulated magnetic intensities of the patterns 80.

FIG. 31 illustrates a magnetic intensity modulation in accordance with the present invention of a differential timing based servo band 97 having a differential timing based pattern string recorded of a track segment TS with a sequence of five (5) differential timing based servo patterns 80 (FIG. 22) and four (4) differential timing based servo patterns 81 (FIG. 23). Generally, each pattern 80 and 81 is formed with one of two or more magnetic intensities to thereby provide a LPOS encoding of a last bit of the pattern. Specifically, a magnetic intensity of $\Phi 1$ encodes each last bit of patterns 80 and 81 as a bit "0" and a magnetic intensity of $\Phi 2$ encodes each last bit of patterns 80 and 81 as a bit "1", with magnetic intensity $\Phi 1$ being less than magnetic intensity $\Phi 2$ as represented by the thickness of the corresponding bursts. Additionally, a first bit for each pattern 80 is encoded as a bit "0", and a first bit for each pattern 81 is encoded as bit "1". Thus, band 97 has a "000001000110111011" LPOS encoding based on both the modulated magnetic intensities and the individual LPOS encodings of the patterns 80 and 81

FIG. 32 illustrates a magnetic intensity/pattern interspacing modulation in accordance with the present invention of a differential timing based servo band 98 having a differential timing based pattern string of nine (9) differential timing based servo patterns 80 (FIG. 22) recorded on a track segment TS. Generally, each pattern 80 is formed with one of two or more magnetic intensities to thereby provide a LPOS encoding of a last bit of the pattern 80 and a pattern interspacing modulation as described in connection with FIG. 10 is applied to encode the first bit of each pattern 80. Specifically, a magnetic intensity of $\Phi 1$ encodes a pattern 80 as a bit "0" and a magnetic intensity of $\Phi 2$ encodes a pattern 80 as a bit "1", with magnetic intensity $\Phi 1$ being less than magnetic intensity $\Phi 2$ as represented by the thickness of the corresponding bursts. Thus, band 98 has a "000100010011101110" LPOS encoding based on the modulated magnetic intensities and pattern interspacing of the patterns 80.

FIG. 33 illustrates a magnetic intensity/pattern interspacing modulation in accordance with the present invention of a differential timing based servo band 99 having a differential timing based pattern string recorded of a track segment TS with a sequence of a first three (5) differential timing based servo patterns 80 (FIG. 22), a first two (4) differential timing based servo patterns 81 (FIG. 23), a third and a final differential timing based servo pattern 80 and a third and a final differential timing based servo pattern 81. Generally, each pattern 80 is formed with one of two or more magnetic intensities to thereby provide a LPOS encoding of a last bit of the pattern 80 and a pattern interspacing modulation as described in connection with FIGS. 12 and 14 is applied to encode the middle bit of each pattern 80. Specifically, a magnetic intensity of Φ1 encodes a pattern 80 as a bit "0" and a magnetic intensity of Φ2 encodes a pattern 80 as a bit "1", with magnetic intensity Φ1 being less than magnetic intensity Φ2 as represented by the thickness of the corresponding bursts. Additionally, first bit for each pattern 80 is encoded as a bit "0", and a first bit for each pattern 81 is encoded as bit "1". Thus, band 99 has a "00000100010110001101011110" LPOS encoding based on the modulated magnetic intensities and pattern interspacing of patterns 80 and 81.

Figure 34:
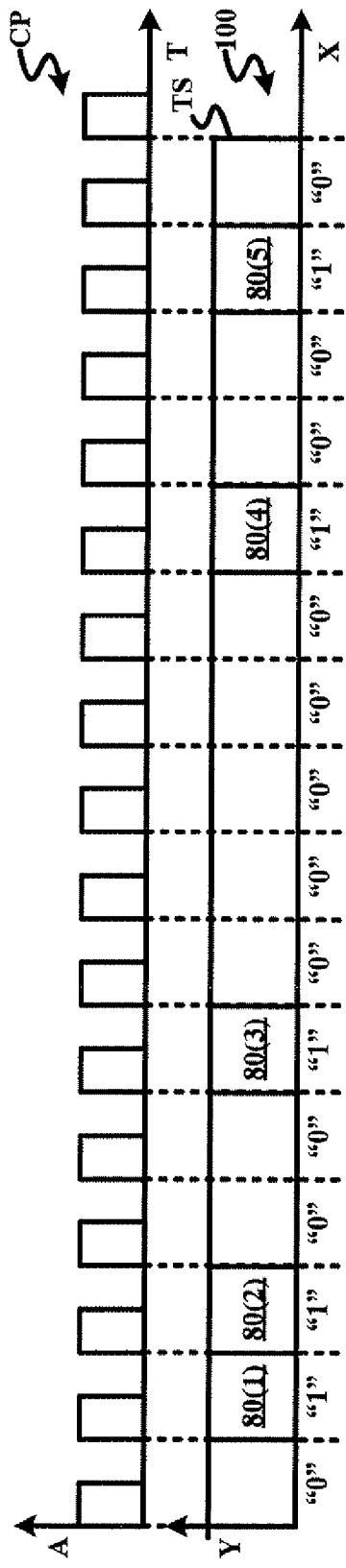
FIG. 34 illustrates a third pulse position modulated embodiment of a LPOS encoded timing based servo band in accordance with the present invention.

FIG. 34 illustrates a pulse position modulation in accordance with the present invention of a differential timing based servo band 100 having a differential timing based pattern string of five (5) differential timing based servo patterns 80 (FIG. 1) recorded on a track segment TS. Generally, patterns 80 are sparely positioned relative to a set of clock pulses CP to LPOS encode band 100. Specifically, a pulse position exclusive of a pattern 80 is encoded as a bit "0" and a pulse position inclusive of a pattern 80 is encoded as a bit "1". Thus, 100 has a "0110010000010010" LPOS encoding based on the modulated pulse positioning of the patterns 80. For this embodiment, a run-length-limit indicative of a maximum number of encoded "0" bits between "1" bits can be established to thereby minimize a count of "0" bits between "1" bits whereby the clock pulses between patterns 80 can be easily and efficiently counted. Furthermore, a band derived from band 100 based on a magnetic intensity modulation of patterns 80 of band 100 introduces an additional bit per pattern for two bits per pattern that results in a more extensive LPOS encoding than band 100.

Figure 35:
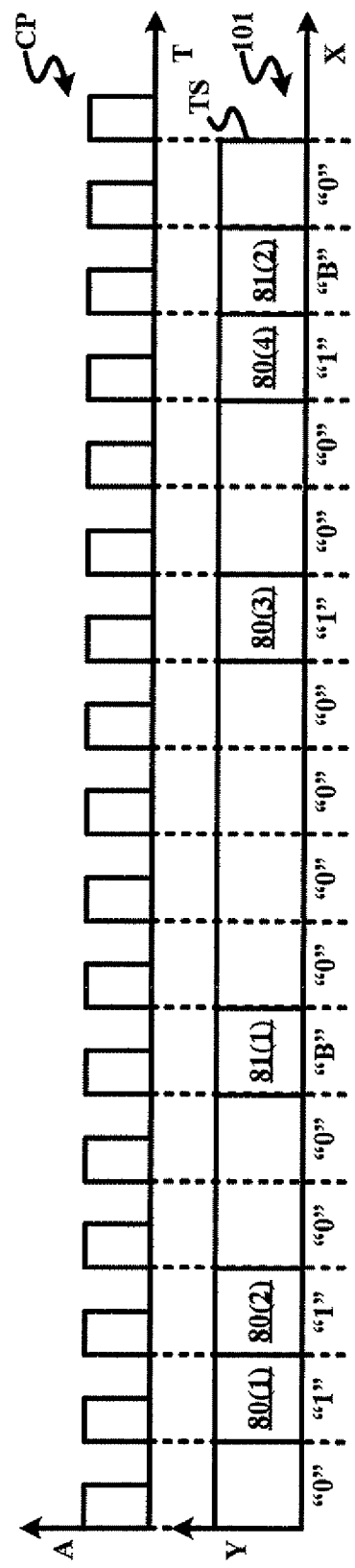
FIG. 35 illustrates a fourth pulse position modulated embodiment of a LPOS encoded timing based servo band in accordance with the present invention.

FIG. 35 illustrates a pulse position modulation in accordance with the present invention of a differential timing based servo band 101 having a differential timing based pattern string recorded on a track segment TS with a sequence of a first two differential timing based servo patterns 80, a first differential timing based servo pattern 81, a third and a final differential timing based servo pattern 80, and a final differential timing based servo pattern 81. Generally, each pattern is sparely positioned relative to a set of clock pulses CP to LPOS encode band 101. Specifically, a pulse position exclusive of a pattern is encoded as a bit "00", a pulse position inclusive of a pattern 80 is encoded as a bits "a", and a pulse position inclusive of a pattern 81 is encoded as a word break "B". Thus, band 101 has a "01100", "00001001", "0" LPOS encoding based on the modulated pulse positioning of the patterns and the LPOS encoding of patterns 80 and 81. Again, for this embodiment, a run-length-limit indicative of a maximum number of encoded "00" bits between the other bits can be established to thereby minimize a count of "0" bits between the other bits whereby the clock pulses between patterns can be easily and efficiently counted.

Referring to FIGS. 10-35, those having ordinary skill in the art will appreciate the unlimited variations in modulated timing based servo bands as evidenced by FIGS. 10-21. Those having ordinary skill in the art will further appreciate the numerous advantages of the present invention, including, but not limited to, an ability to implement a servo control system in an uncomplicated yet innovative manner that can incorporate a lateral guiding servo as known in the art for using leading and trailing edges of each magnetic stripe, and a velocity control as known in the art for using a leading edge of a leading magnetic stripe of a burst and a trailing edge of a final magnetic stripe of the same burst.

Figure 36:
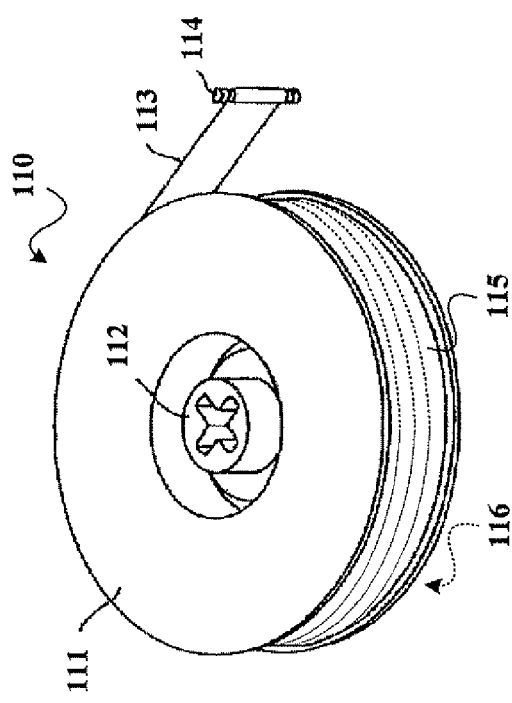
FIG. 36 illustrates one embodiment of a tape storage media in accordance with the present invention.
Figure 37:
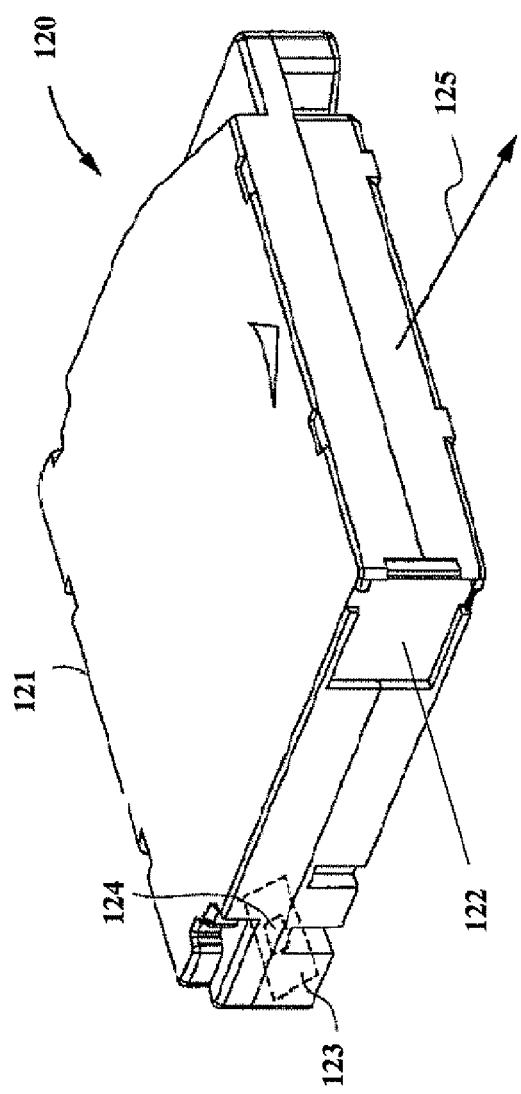
FIG. 37 illustrates one embodiment of a tape storage media cartridge in accordance with the present invention.

FIGS. 36 and 37 respectively illustrate a tape storage media 110 as an exemplary form of a magnetic storage media for practicing the inventive principles of the present invention as previously described herein, and a tape storage cartridge 120 as an exemplary form of a magnetic storage cartridge for practicing the inventive principles of the present invention as previously described herein. Tape storage media 110 is contained with a shell housing 121 of tape storage cartridge 120 that is adapted to interface with a tape drive (not shown).

Specifically, tape cartridge 120 includes exterior cartridge shell 121 and sliding door 122. Sliding door 122 is slid open when tape cartridge 120 is inserted into a tape drive (not shown). Sliding door 122 is normally closed when tape cartridge 120 is not in use, so that debris and contaminants do not enter tape cartridge 120 and degrade tape storage media 110. The direction that tape cartridge 120 is slid into the tape drive is shown as direction 125. Tape cartridge 120 also contains a cartridge memory 124, which is on a printed circuit board 123. Cartridge memory 124 is preferably at a 45° angle, to allow the tape drive and pickers of an automated storage library (not shown) to access the contents of cartridge memory 124.

Tape storage media 110 includes a tape reel 111, which is prevented from rotation by a brake button 112 when tape cartridge 120 is inserted in a tape drive (not shown). The tape drive releases brake button 112 when tape cartridge 120 is inserted into the tape drive, which then allows the free rotation of tape reel 111. Tape reel 111 is wound with tape 115, which is preferably magnetic tape. Alternatively, tape 115 could equally be magneto-optical or optical phase-change tape. On the free end of tape 115 is an optional leader tape 113 and leader pin 114. When tape cartridge 120 is slid into the tape drive, sliding door 122 is opened, and the tape drive threads leader pin 114 and attached leader tape 113 and tape 115 through the tape path. Tape 115 may be a data tape or a cleaner tape. Tape 115 may use the identical formulation of tape for both data and cleaning purposes. The contents of cartridge memory 124 are used to distinguish tape cartridge 120 as either a data cartridge or a cleaner cartridge. Optional leader tape 113 is preferably a thicker section of tape 115 which better withstand the load/unload operations of the tape drive.

As related to the a servo control of tape 115, servo tracks 116 are recorded on tape 115 in accordance with the inventive principles of the present invention. In particular, one or more servo bands implementing a version of one of the FIGS. 10-21 and 24-35 modulated timing based servo pattern string embodiments of the present invention are recorded on servo tracks 116 to thereby facilitate an advantageous execution of a servo control of tape 115.

FIGS. 38 and 39 respectively illustrate a front end 131 and rear end 132 of a tape drive 130. Installed within tape drive 130 is a servo control system for positioning a transducer (not shown) adjacent a surface of a tape storage media (e.g., tape storage media 110 shown in FIG. 22) whereby one or more servo read heads of the transducer are operable to read a version of one of the FIGS. 10-21 and 24-35 modulated timing based servo pattern string embodiments of the present invention as recorded on one or more servo tracks of the tape storage media.

Figure 40:
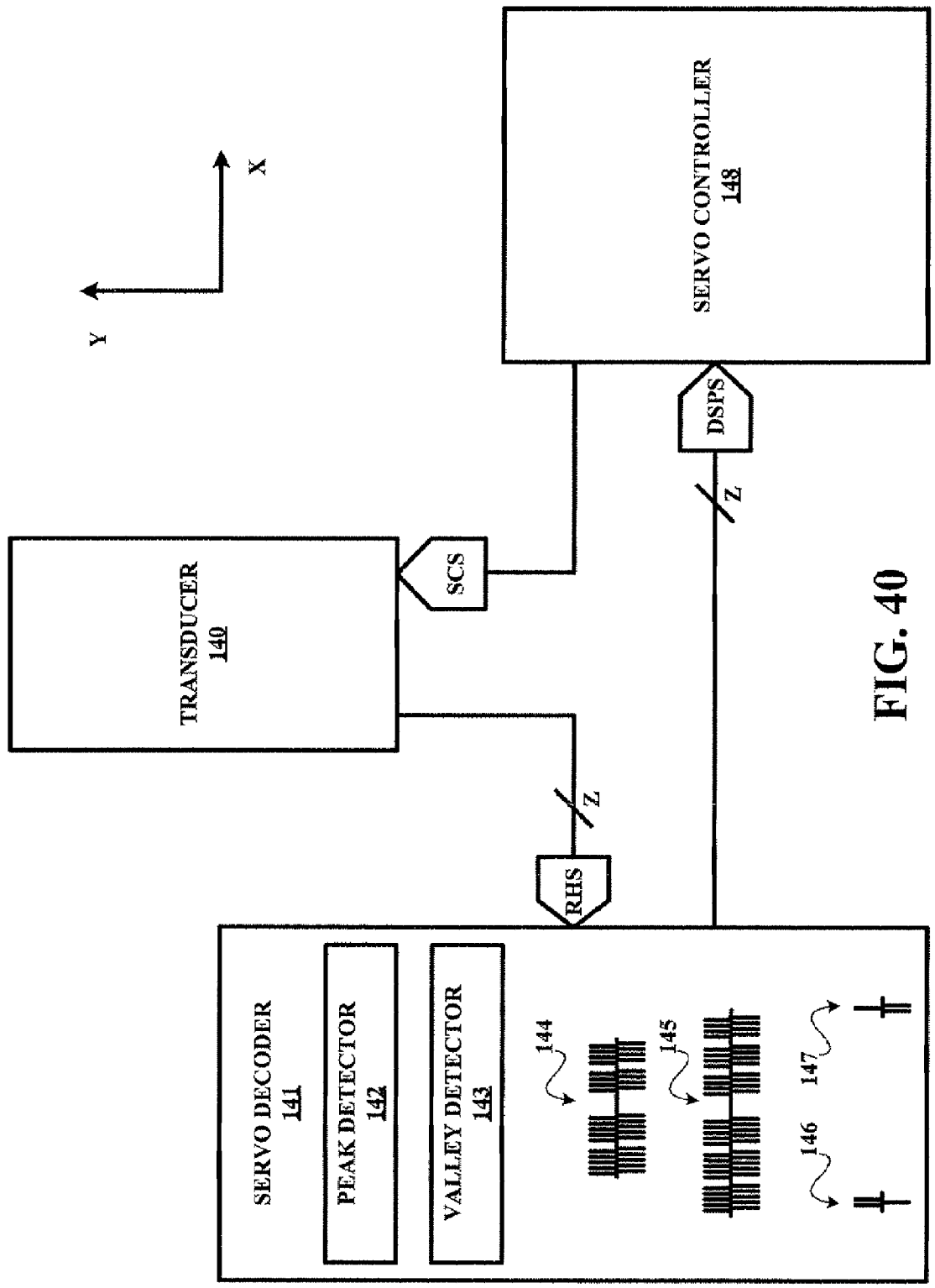
FIG. 40 illustrates one embodiment of a servo control system in accordance with the present invention.

FIG. 40 illustrates an exemplary servo control system of the present invention employing a transducer 140, a servo decoder 141 and a servo controller 148. Transducer 140 includes one or more servo read heads whereby each servo read head is operable to a version of one of the FIGS. 10-21 and 24-35 modulated timing based servo pattern string embodiments of the present invention as recorded on a servo track of the tape storage media to thereby generate a read head signal RHS representative of the modulated timing based servo pattern string. Servo decoder 141 decodes each read head signal RHS and generates a decoded servo position signal DSPS that indicates a position of the corresponding servo read head relative to the tape storage media. Servo controller 148 is operable to generate a servo control signal SCS based on each decoded servo position signal DSPS generated by servo decoder 141 whereby a translation assembly (not shown) of transducer 140 is selectively activated in response to servo control signal SCS to thereby move transducer 140 relative to the tape storage media along translation axis Y as needed.

In order to decode each read head signal RHS, servo decoder 141 employs a peak detector 142 and a valley detector 143 per each servo read head of transducer 113. Each peak detector 142 generates a peak detection signal and each valley detector 143 generates a valley detection signal whereby the peak detection signal(s) and the valley detection signal(s) are further processed to generate the decoded servo position signal(s) DSPS as would be appreciated by those having ordinary skill in the art. Specifically, peak detector 142 and valley detector 143 act in combination to detect the peak-valley-peak-valley representative of position signals when a modulated timing based servo pattern string of the present invention is being read by transducer 140. In this way, decoder 141 gathers the decoded servo position signal DSPS.

For example, peak detector 142 and valley detector 143 act in combination to detect a peak-valley-peak-valley representation 144 of timing based servo pattern 30 (FIG. 1) to thereby facilitate a determination of decoded servo position signal DSPS by servo decoder 141. Also by example, peak detector 142 and valley detector 143 act in combination to detect the peak-valley-peak-valley representation 145 of differential timing based servo pattern 40 (FIGS. 4 and 5) to thereby facilitate a determination of decoded servo position signal DSPS by servo decoder 141. By further example, peak detector 142 and valley detector 143 to detect the peak-valley-peak representation 146 of differential timing based servo patterns 80 (FIG. 22) to thereby facilitate a determination of decoded servo position signal DSPS by servo decoder 141, and peak detector 142 and valley detector 143 to detect the valley-peak-valley representation 147 of differential timing based servo patterns 81 (FIG. 23) to thereby facilitate a determination of decoded servo position signal DSPS by servo decoder 141. For magnetic intensity modulation embodiments of the present invention, peak detector 142 and valley detector 143 are further capable of detecting differences in magnetic intensities (e.g., Φ1 and Φ2 shown in FIG. 16) by looking at the amplitude of the peak-valley signals (e.g., 144-147).

Those having ordinary skill in the art of servo control techniques may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A magnetic storage media, comprising:
a servo track segment; and
a timing based servo band recorded on the servo track segment,
wherein the timing based servo band includes a modulated timing based servo pattern string representative of magnetic encoded servo position information for facilitating a determination of a servo position error signal, wherein the modulated timing based servo pattern string includes a pattern interspacing modulation between at least two timing based servo patterns, and
wherein a first interspace distance between two consecutive patterns equals one half of a second interspace distance.

2. The magnetic storage media of claim 1, wherein the modulated timing based servo pattern string includes:
a timing based servo pattern including at least one burst, each at least one burst including at least one magnetic stripe.

3. The magnetic storage media of claim 1, wherein the modulated timing based servo pattern string includes:
a differential timing based servo pattern.

4. The magnetic storage media of claim 1, wherein the modulated timing based servo pattern string includes a magnetic intensity modulation between at least two timing based servo patterns.

5. The magnetic storage media of claim 1, wherein the modulated timing based servo pattern string includes a pulse position modulation of at least two timing based servo patterns.

6. The magnetic storage media of claim 1, wherein the modulated timing based servo pattern string includes a linear position individual encoding of at least one timing based servo pattern.

7. The magnetic storage media of claim 1, wherein an interspacing between patterns is intermittently modulated to obtain an encoding of a band.

8. The magnetic storage media of claim 1, wherein:
an interspace distance D2 between two consecutive patterns equals one-half of an interspace distance D1 to encode a succeeding pattern as a bit "0", and
an interspace distance D3 between two consecutive patterns equals twice the interspace distance D1 to encode the succeeding pattern as a bit "1".

9. A magnetic storage media cartridge, comprising:
a cartridge housing adapted to interface with a cartridge drive; and a magnetic storage media contained within the cartridge housing, the magnetic storage media including:
a servo track segment; and
a timing based servo band recorded on the servo track segment,
wherein the timing based servo band includes a modulated timing based servo pattern string representative of magnetic encoded servo position information for facilitating a determination of a servo position error signal, wherein the modulated timing based servo pattern string includes a pattern interspacing modulation between at least two timing based servo patterns, and
wherein a first interspace distance between two consecutive patterns equals one half of a second interspace distance.

10. The magnetic storage media cartridge of claim 9, wherein the modulated timing based servo pattern string includes:
a timing based servo pattern including at least one burst, each at least one burst including at least one magnetic stripe.

11. The magnetic storage media cartridge of claim 9, wherein the modulated timing based servo pattern string includes: a
differential timing based servo pattern.

12. The magnetic storage media cartridge of claim 9, wherein the modulated timing based servo pattern string includes a magnetic intensity modulation between at least two timing based servo patterns.

13. The magnetic storage media cartridge of claim 9, wherein the modulated timing based servo pattern string includes a pulse position modulation of at least two timing based servo patterns.

14. The magnetic storage media cartridge of claim 9, wherein the modulated timing based servo pattern string includes a linear position individual encoding of at least one timing based servo pattern.

15. The magnetic storage media cartridge of claim 9, wherein an interspacing between patterns is intermittently modulated to obtain an encoding of a band.

16. The magnetic storage media cartridge of claim 9, wherein
an interspace distance D2 between two consecutive patterns equals one-half of an interspace distance D1 to encode a succeeding pattern as a bit "0", and
an interspace distance D3 between two consecutive patterns equals twice the interspace distance D1 to encode the succeeding pattern as a bit "1".

17. A magnetic storage media drive, comprising: a transducer including a servo read head operable to generate a read head signal representative of a reading of a magnetic storage media including
a servo track segment; and
a timing based servo band recorded on the servo track segment, wherein the timing based servo band includes a modulated timing based servo pattern string representative of magnetic encoded servo position information for facilitating a determination of a servo position error signal, wherein the modulated timing based servo pattern string includes a pattern interspacing modulation between at least two timing based servo patterns;
a servo decoder in electrical communication with the transducer to receive the read head signal, the servo decoder being operable to generate a decoded servo position signal as a function of determining the servo position error signal based on the read head signal, the decoded servo position signal being indicative of a position of the transducer relative to the magnetic storage media; and
a servo controller in electrical communication with the servo decoder to receive the decoded servo position signal, the servo controller being operable to generate a servo control signal for selectively moving the transducer relative to the magnetic storage media, wherein a first interspace distance between two consecutive patterns equals one half of a second interspace distance.

18. The magnetic storage media drive of claim 17, wherein the modulated timing based servo pattern string includes:
a timing based servo pattern including at least one burst, each at least one burst including at least one magnetic stripe.

19. The magnetic storage media drive of claim 17, wherein the modulated timing based servo pattern string includes: a differential timing based servo pattern.

20. The magnetic storage media drive of claim 17, wherein the modulated timing based servo pattern string includes a magnetic intensity modulation between at least two timing based servo patterns.

21. The magnetic storage media drive of claim 17, wherein the modulated timing based servo pattern string includes a pulse position modulation of at least two timing based servo patterns.

22. The magnetic storage media drive of claim 17, wherein the modulated timing based servo pattern string includes a linear position individual encoding of at least one timing based servo pattern.

23. The magnetic storage media drive of claim 17, wherein an interspacing between patterns is intermittently modulated to obtain an encoding of a band.

24. The magnetic storage media drive of claim 17, wherein an interspace distance D2 between two consecutive patterns equals one-half of an interspace distance D1 to encode a succeeding pattern as a bit "0", and
an interspace distance D3 between two consecutive patterns equals twice the interspace distance D1 to encode the succeeding pattern as a bit "1".

* * * * *